(12) United States Patent
Miyagawa et al.

(10) Patent No.: US 10,627,312 B2
(45) Date of Patent: Apr. 21, 2020

(54) PARTICULATE MATTER SENSOR AND PARTICULATE MATTER SENSING SYSTEM

(71) Applicant: DENSO CORPORATION, Kariya, Aichi-pref. (JP)

(72) Inventors: Go Miyagawa, Kariya (JP); Kouji Andoh, Kariya (JP); Masayuki Tamura, Kariya (JP); Hirokatsu Imagawa, Kariya (JP); Takao Mishima, Kariya (JP); Hideki Yamada, Kariya (JP); Masahiro Yamamoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 215 days.

(21) Appl. No.: 15/740,507

(22) PCT Filed: Jun. 8, 2016

(86) PCT No.: PCT/JP2016/067125
§ 371 (c)(1),
(2) Date: Dec. 28, 2017

(87) PCT Pub. No.: WO2017/002568
PCT Pub. Date: Jan. 5, 2017

(65) Prior Publication Data
US 2018/0195933 A1   Jul. 12, 2018

(30) Foreign Application Priority Data

Jun. 30, 2015 (JP) ................................. 2015-131418
Aug. 27, 2015 (JP) ................................. 2015-168062

(51) Int. Cl.
*G01M 15/10* (2006.01)
*G01N 15/06* (2006.01)
(Continued)

(52) U.S. Cl.
CPC ......... *G01M 15/102* (2013.01); *F01N 11/002* (2013.01); *G01M 15/10* (2013.01);
(Continued)

(58) Field of Classification Search
CPC ... G01M 15/102; G01M 15/10; F01N 11/002; G01N 15/0656; G01N 27/04; G01N 15/0606; G01N 2015/0046
See application file for complete search history.

(56) References Cited

U.S. PATENT DOCUMENTS

| 8,182,665 | B2 * | 5/2012 | Dorfmueller | ........... F01N 11/00 204/424 |
| 8,225,640 | B2 * | 7/2012 | Nelson | ............... G01N 15/0656 73/28.01 |

(Continued)

FOREIGN PATENT DOCUMENTS

| JP | 2004-325218 | 11/2004 |
| JP | 2005-283177 | 10/2005 |

(Continued)

*Primary Examiner* — Freddie Kirkland, III
(74) *Attorney, Agent, or Firm* — Nixon & Vanderhye P.C.

(57) ABSTRACT

A particulate matter sensor and a particulate matter sensing system using such a sensor are provided which are capable of being produced at decreased cost and accurately measuring the temperature of a heater. The particulate matter sensor includes a deposition portion on which particulate matter contained in exhaust gas is accumulated, a pair of electrodes which are disposed on the deposition portion and separate from each other, a heater which heats the deposition portion, and a pair of heater leads which form a path through which electrical current is delivered to the heater. A sensing line is connected to at least one of the heater leads to measure a resistance of the heater lead.

8 Claims, 16 Drawing Sheets

(51) Int. Cl.
*G01N 27/04* (2006.01)
*F01N 11/00* (2006.01)
*G01N 15/00* (2006.01)

(52) U.S. Cl.
CPC ..... *G01N 15/0606* (2013.01); *G01N 15/0656* (2013.01); *G01N 27/04* (2013.01); *G01N 2015/0046* (2013.01)

(56) References Cited

U.S. PATENT DOCUMENTS

| | | | | |
|---|---|---|---|---|
| 8,249,827 B2* | 8/2012 | Nelson | ............... | F02D 41/1466 324/71.1 |
| 8,382,884 B2* | 2/2013 | Okayama | ............. | G01N 27/226 60/275 |
| 8,578,756 B2* | 11/2013 | Suzuki | .................... | G01K 7/16 73/23.31 |
| 8,823,400 B2* | 9/2014 | Hocken | ............... | F02D 41/1466 324/691 |
| 8,823,401 B2* | 9/2014 | Roth | ................... | G01N 15/0656 324/699 |
| 8,915,119 B2* | 12/2014 | Ueno | ..................... | F01N 9/002 73/23.33 |
| 9,334,773 B2* | 5/2016 | Lin | .......................... | F01N 3/023 |
| 10,240,984 B2* | 3/2019 | Hocken | ..................... | G01K 7/16 |
| 2010/0147052 A1* | 6/2010 | Nelson | ............... | G01N 15/0656 73/28.01 |
| 2011/0109331 A1* | 5/2011 | Nelson | ................ | F02D 41/1466 324/693 |
| 2011/0252865 A1 | 10/2011 | Tokuda et al. | | |
| 2011/0283773 A1* | 11/2011 | Suzuki | ..................... | G01K 7/16 73/25.05 |
| 2012/0119759 A1* | 5/2012 | Nelson | ................ | F02D 41/1466 324/691 |
| 2012/0186330 A1 | 7/2012 | Ueno et al. | | |
| 2012/0324982 A1* | 12/2012 | Hocken | ................... | F01N 11/00 73/28.01 |
| 2013/0256296 A1* | 10/2013 | Hocken | ................... | G01K 7/16 219/497 |
| 2018/0259439 A1* | 9/2018 | Andoh | ............... | F02D 41/1466 |

FOREIGN PATENT DOCUMENTS

| | | |
|---|---|---|
| JP | 2006-266961 | 10/2006 |
| JP | 2006-284223 | 10/2006 |
| JP | 2009-133808 | 6/2009 |

\* cited by examiner

PARTICULATE MATTER SENSOR AND PARTICULATE MATTER SENSING SYSTEM

This application is the U.S. national phase of International Application No. PCT/JP2016/067125 filed 8 Jun. 2016, which designated the U.S. and claims priority to JP Patent Application No. 2015-131418 filed 30 Jun. 2015, and JP Patent Application No. 2015-168062 filed 27 Aug. 2015, the entire contents of each of which are hereby incorporated by reference.

TECHNICAL FIELD

The present invention generally relates to a particulate matter sensor which measures particulate matter contained in exhaust gas and a particulate matter sensing system using such a particulate matter sensor.

BACKGROUND ART

A particulate matter sensor which measures the quantity of particulate matter (PM) contained in exhaust emissions and a particulate matter sensing system using such a sensor are known (Publication of US patent application No. 2013/0256296 A1). The particulate matter sensor includes a pair of electrodes separate from each other and a heater which heats the electrodes. The particulate matter sensing system is equipped with the particulate matter sensor and a control circuit connected to the particulate matter sensor.

The control circuit is designed to switch between a measuring mode and a burning mode in a control operation. In the measuring mode, voltage is applied between the electrodes of the particulate matter sensor. This causes particulate matter emissions to be converged by electrostatic force, so that electrical current flows between the electrodes. The amount of particulate matter contained in the exhaust emissions is calculated by measuring the value of the electrical current to determine a value of resistance of the particulate matter deposited between the electrodes. When the measuring mode continues to be performed for a while, a great deal of particulate matter is accumulated between the electrodes, so that the electrical current is saturated. In this time, the measuring mode is changed to the burning mode to actuate the heater to burn off the accumulated particulate matter. This restores the particulate matter sensor.

Recent years, development has been carried out to measure the temperature of the heater accurately. Specifically, the resistance of the particulate matter usually depends upon the temperature thereof. Therefore, as long as the temperature of the heater, that is, the temperature of the particulate matter is accurately measured in the measuring mode, it is possible to correct the measured value of the resistance of the particulate matter to achieve accurate calculation of the amount of particulate matter contained in the exhaust emissions. Additionally, when the temperature of the heater is accurately measured in the burning mode, it is possible to preciously control the temperature of the heater, thereby preventing the temperature of the heater from being excessively elevated or lowered. This eliminates a risk that the heater is deteriorated due to an excessive increase in temperature thereof, or a lack in burning the particulate matter due to an excessive decrease in temperature thereof. For these reasons, it is sought to accurately measure the temperature of the heater.

In order to accurately measure the temperature of the heater, the above particulate matter system measure an electrical resistance of the heater. The temperature of the heater and the resistance bear a relation (see FIG. 7). The calculation of the temperature of the heater is, thus, achieved by measuring the resistance of the heater.

SUMMARY OF THE INVENTION

Problem to be Solved by the Invention

It is, however, impossible for the above particulate matter sensor to accurately measure the temperature of the heater. Specifically, the heater has a pair of heater leads which are connected thereto and through which an electrical current is delivered to the heater. It is, therefore, impossible to measure the resistance (i.e., a heater resistance) of the heater alone. Actually, it is possible to measure only a combination (i.e., a total resistance) of the heater resistance and the resistance of the heater leads (i.e., a lead resistance). There is, thus, no alternative to calculate the temperature of the heater using such a measured resistance. The lead resistance greatly depends upon the temperature of the heater leads. The temperature of the heater leads is affected by the temperature of the exhaust emissions. This facilitates a variation in the lead resistance. The use of the total resistance in calculating the temperature of the heater, therefore, results in an error of the temperature of the heater arising from the lead resistance contained in the total resistance.

In order to solve the above problem, a special temperature sensor for the particulate matter sensor may be provided to measure the temperature of the heater. This, however, results in an increase in production cost of the particulate matter sensing system.

The invention was made in view of the above background. It is an object to provide a particulate matter sensor which is capable of reducing a production cost thereof and accurately measuring the temperature of a heater and a particulate matter sensing system using such a particulate matter sensor.

Means for Solving the Problem

The first aspect of the invention is a particulate matter sensor which comprises: (a) a deposition portion on which particulate matter in exhaust gas is permitted to be accumulated; (b) a pair of electrodes which are disposed on the deposition portion and are separate from each other; (c) a heater which heats the deposition portion; and (d) a pair of heater leads which are connected to the heater and define a path through which an electrical current is delivered to the heater. A sensing line is connected to at least one of the heater leads to measure a resistance of the one of the heater leads.

The second aspect of the invention is a particulate matter sensing system which is equipped with the above described particulate matter sensor and a control circuit which is connected to the particulate matter sensor. The control circuit selectively operates in a measuring mode and a burning mode. The measuring mode is to measure a resistance of the particulate matter accumulated between the electrodes and calculate an amount of the particulate matter in the exhaust gas using the measured resistance. The burning mode is to energize the heater to produce heat to burn off the particulate matter accumulated on the deposition portion. In at least one of the measuring mode and the burning mode, the control circuit uses a resistance of the heater leads, as measured using the sensing line, to calculate a lead resistance that is sum of the resistances of the respective heater leads and also determine a total resistance that is sum of a heater resistance of the heater and the lead resistance. The control circuit also subtracts the lead resistance from the total resistance to derive the heater resistance and determines a temperature of the heater using the derived heater resistance.

Beneficial Effects of the Invention

The above particulate matter sensor has the sensing line connected to at least one of the heater leads for measuring the resistance the one of the heater leads. The measurement of the resistance of the heater lead is, therefore, achieved by using the sensing line, thereby enabling the lead resistance that is the sum of the resistances of the respective heater leads to be determined. In the particulate matter sensor, the voltage is applied between the heater leads to measure the total resistance that is the sum of the heater resistance that is a resistance of the heater and the above described lead resistance. The particulate matter sensor is, as described above, capable of calculating the lead resistance. The calculated lead resistance is, therefore, subtracted from the measured total resistance to accurately derive the heater resistance from which the lead resistance that is a factor for an error is removed. The temperature of the heater may, therefore, be calculated preciously using the heater resistance. Accordingly, when the amount of the particulate matter in the exhaust gas is required to be measured, it may be accurately determined by correcting the resistance of the particulate matter using a measured value of the temperature of the heater. When the particulate matter is required to be burned, the temperature of the heater is capable of being precisely controlled.

Similarly, the above described particulate matter sensing system is capable of calculating the heater resistance using the above control circuit and using it to accurately determine the temperature of the heater.

The above described particulate matter sensor and the particulate matter sensing system are capable of measuring the temperature of the heater without use of a special temperature sensor, thereby enabling production costs thereof to be reduced.

As apparent from the above discussion, the invention is capable of providing a particulate matter sensor and a particulate matter sensing system using such a sensor which are capable of being produced at decreased cost and accurately measuring the temperature of a heater.

EMBODIMENTS FOR CARRYING OUT THE INVENTION

The above described particulate matter sensor and the above described particulate matter sensing system may be mounted in diesel powered vehicles.

EMBODIMENTS

First Embodiment

Figure 1:
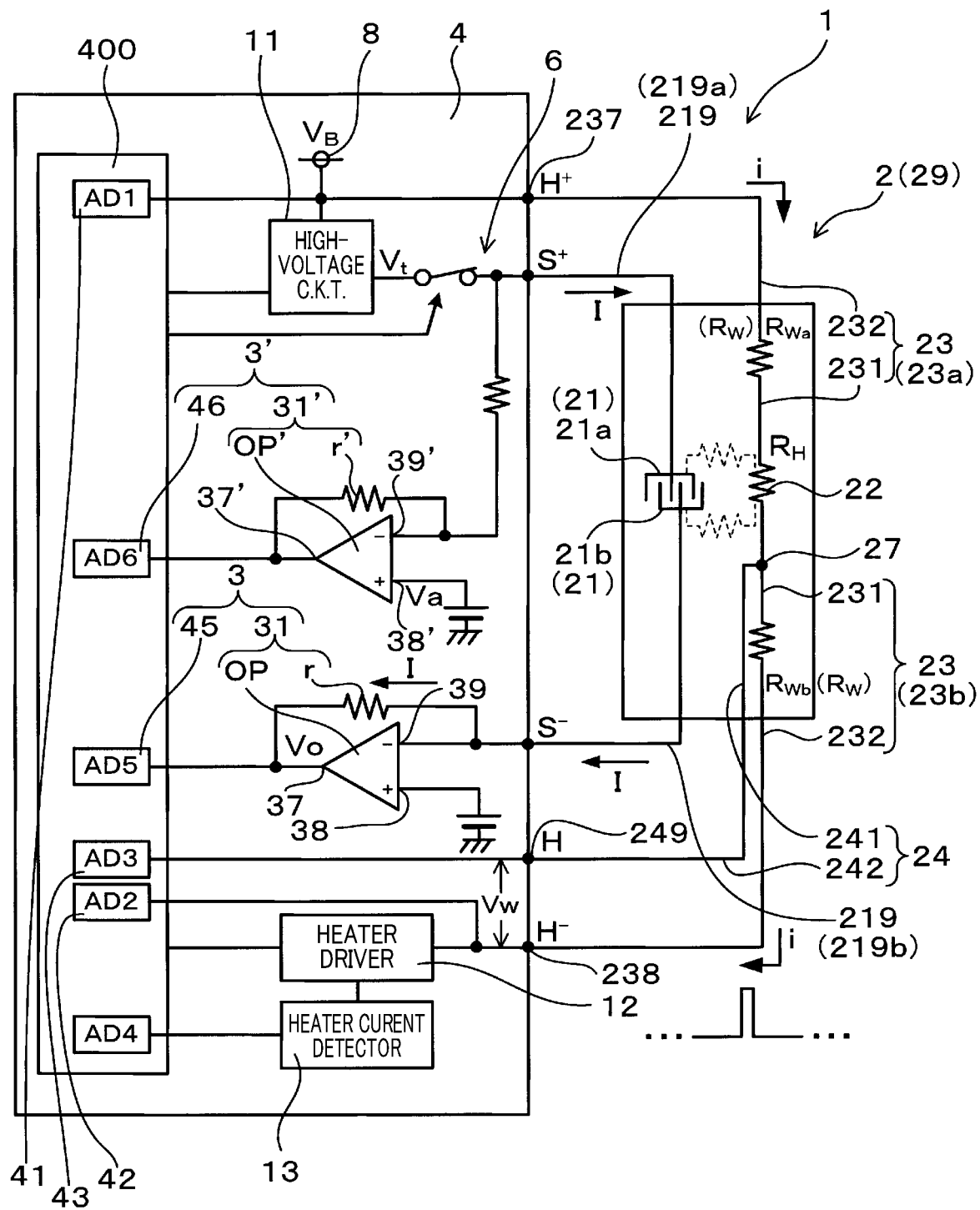
FIG. 1 is a circuit diagram of a particulate matter sensing system in a measuring mode according to the first embodiment.

An embodiment of the above particulate matter sensing system will be described using FIGS. 1 to 10. The particulate matter sensor 2 of this embodiment, as illustrated in FIGS. 1 and 3, includes the deposited portion 20, a pair of electrodes 21 (21a, 21b), the heater 22, and a pair of heater leads 23 (23a, 23b). Particulate matter contained in exhaust emissions is accumulated on the deposition portion 20. The two electrodes 21 are disposed at an interval away from each other on the deposition portion 20. The heater 22 works to heat the deposition portion 20. The heater leads 23 are connected to the heater 22 and define path of electrical current i delivered to the heater 22.

One of the heater leads 23a and 23b (which will also be referred to as a second heater lead 23b) has connected thereto the sensing line 24 used for measuring the resistance Rw of the heater leads 23.

The particulate matter sensing system 1 of this embodiment is, as illustrated in FIG. 1, equipped with the particulate matter sensor 2 and the control circuit 4 connected to the particulate matter sensor 2.

Figure 2:
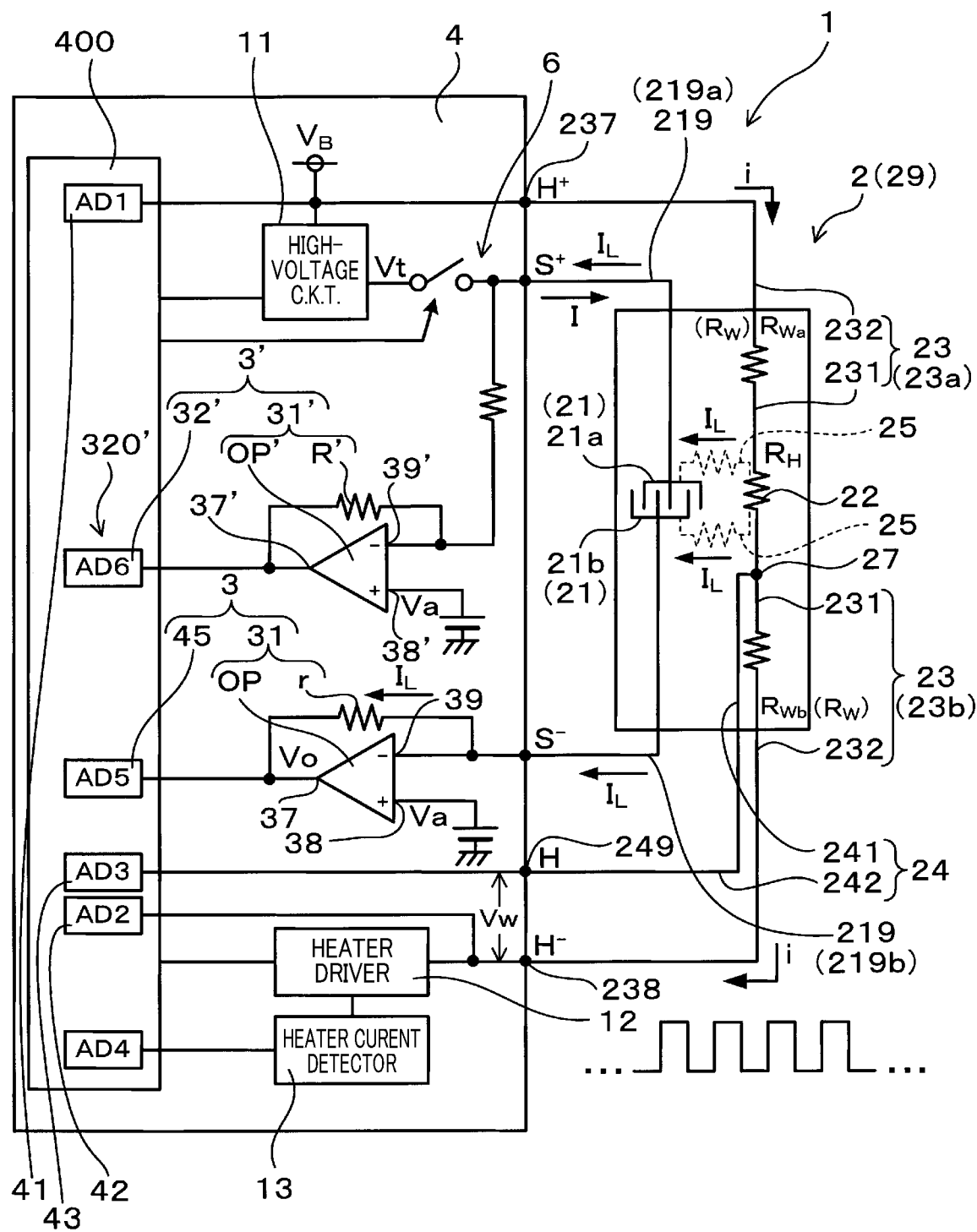
FIG. 2 is a circuit diagram of a particulate matter sensing system in a burning mode according to the first embodiment.
Figure 3:
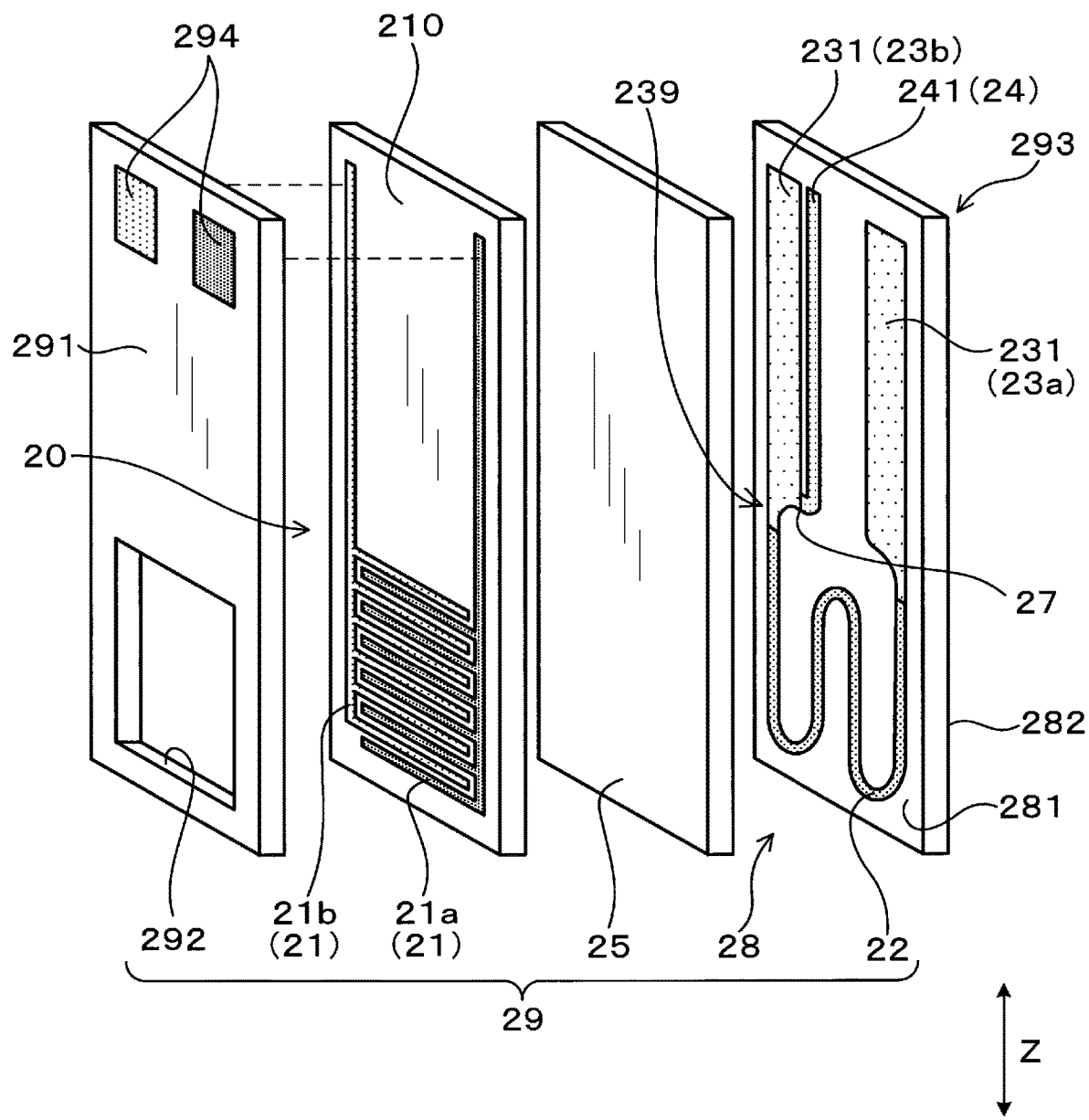
FIG. 3 is an exploded perspective view of a particulate matter sensor in the first embodiment.

The control circuit 4 selectively operates in the measuring mode (see FIG. 1) or the burning mode (see FIG. 2). The measuring mode is to measure the resistance $R_{PM}$ of the particulate matter accumulated between the two electrodes 21 and calculate the amount of particulate matter contained in the exhaust emissions using the measured resistance $R_{PM}$. The burning mode is to energize the heater 22 to burn off the particulate matter deposited on the deposition portion 20.

The control circuit 4 calculates the lead resistance $Rw_{ab}$ (=$2R_{wb}$) using the resistance Rw ($R_{wb}$) of the heater leads 23b, as measured using the sensing line 24 in at least one of the burning mode and the measuring mode. The lead resistance $Rw_{ab}$ is the sum of the resistances Rw of the heater leads 23a and 23b. The control circuit 4 also determines the total resistance $R_{wab}$ that is the sum of heater resistance $R_H$ that is the resistance of the heater 22 and the lead resistance $R_{wab}$, subtracts the lead resistance $R_{wab}$ from the total resistance Rs to derive the heater resistance $R_H$, and calculates the temperature of the heater 22 using the heater resistance $R_H$.

The particulate matter sensor 2 and the particulate matter sensing system 1 are mounted in the diesel-powered vehicle. The control circuit 4, as illustrated in FIG. 1, includes the high-voltage circuit 11, the current measuring portion 3, the sub-current measuring portion 3', the heater driver circuit 12, the heater current measuring circuit 13, the switch 6, and the microcomputer 400.

Each of the heater leads 23 includes the first lead portion 231 formed on the sensor device 29, which will be described later, and the second lead portion 232 connected to the first lead portion 231. Similarly, the sensing line 24 includes the first sensing portion 241 formed on the sensor device 29 and the second sensing portion 241 connected to the first sensing portion 241.

Figure 4:
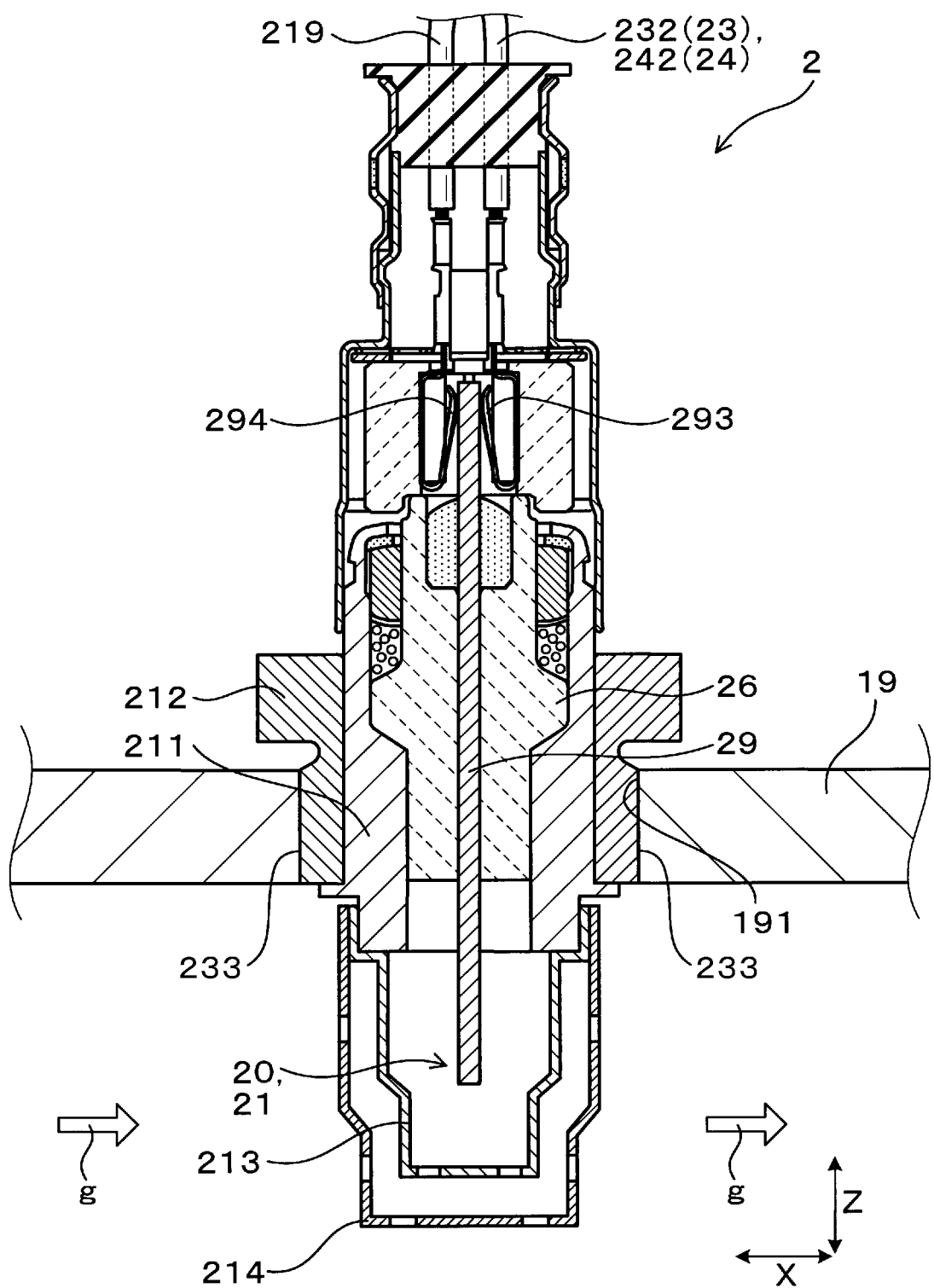
FIG. 4 is a sectional view of a particulate matter sensor mounted in an exhaust pipe in the first embodiment.

The particulate matter sensor 2, as illustrated in FIG. 4, includes the sensor device 29, the holding portion 26 which retains the sensor device 29, the housing 211, the fastening portion 212, and the covers 213 and 214. The holding portion 26 is made of ceramic. The housing 211 and the fastening portion 212 are made of metal. The holding portion 26 surrounds the sensor device 29 and retains the sensor device 29. The holding portion 26 isolates the sensor device 29 and the housing 211 from each other. The fastening portion 212 has the external thread 233 formed thereon. The external thread 233 engages the internal thread 191 formed in the exhaust pipe 19 to achieve a joint of the particulate matter sensor 2 to the exhaust pipe 19.

The sensor device 29 is, as illustrated in FIG. 3, equipped with the heater base plate 28, the electrode-formed plate 210, the insulating plate 25, and the cover plate 291. The heater base plate 28, the electrode-formed plate 210, the insulating plate 25, and the cover plate 291 are made of ceramic. The heater 22, the first lead portion 231, and the first sensing portion 241 are formed on the first major surface 281 which is one of two major surfaces of the heater base plate 28 and located closer to the electrodes 21 than the major surface 282 is. The second major surface 282 of the heater base plate 28 has formed thereon a plurality of heater connecting pads 293 (see FIG. 4) conducting the first lead portion 231 or the first sensing portion 241.

The electrode-formed plate 210 has a pair of electrodes 21a and 21b. The insulating plate 25 is interposed between the electrode-formed plate 210 and the heater base plate 28. The cover plate 291 has formed therein the opening 292 to which the deposition portion 20 is exposed. The cover plate 291 has formed on a major surface thereof the electrode-connecting pads 294 conducting the electrodes 21a and 21b.

The second lead portion 232 or the second sensing portion 242 is, as illustrated in FIG. 4, connected to the heater connecting pads 293. The electrode leads 219 are connected to the electrode-connecting pads 294.

The holding portion 26, as clearly illustrated in FIG. 4, retains the sensor device 29 with the deposition portion 20 exposed outside the holding portion 26. The deposition portion 20 is exposed to the exhaust gas g flowing in the exhaust pipe 19.

Figure 5:
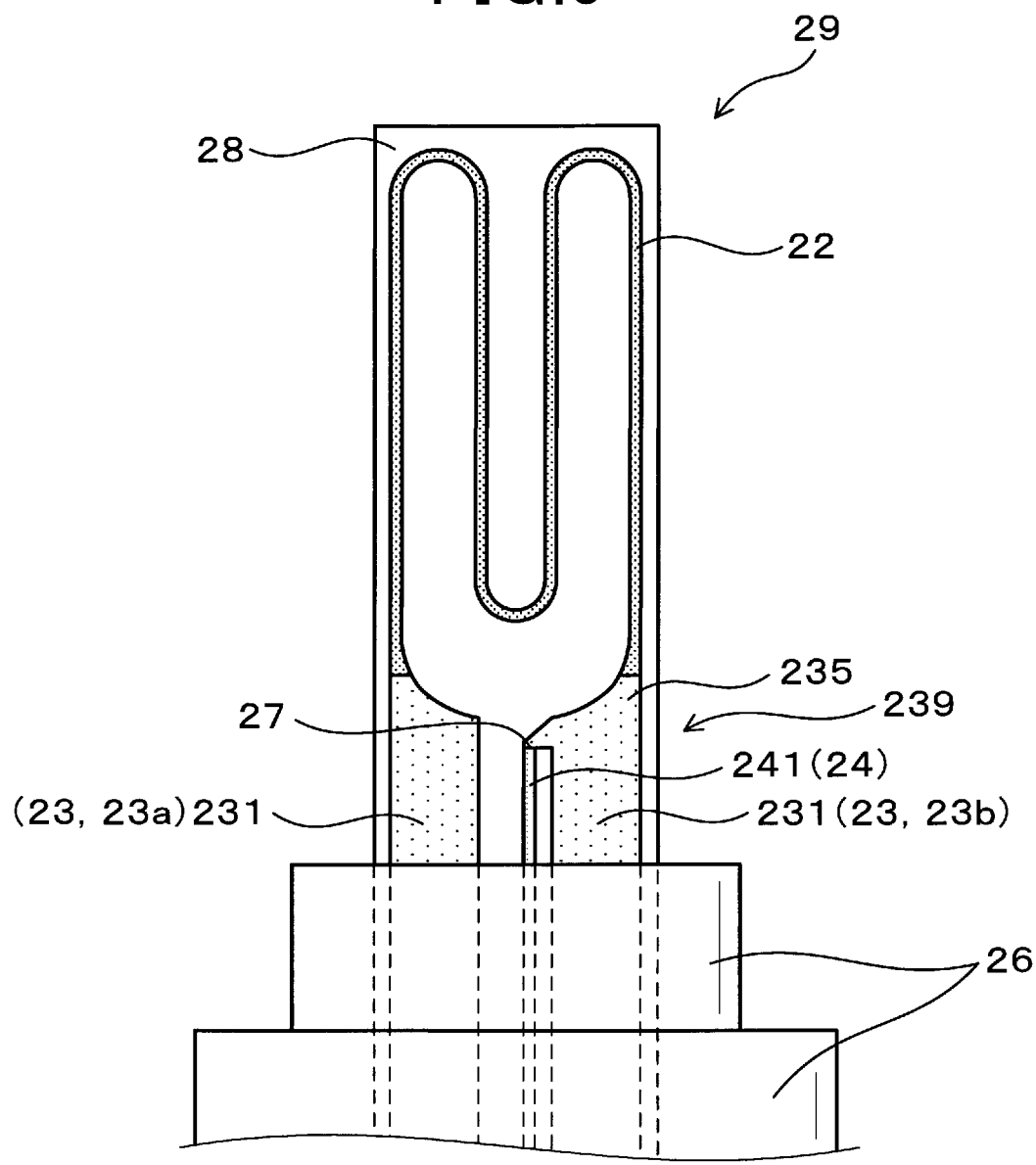
FIG. 5 is an enlarged plan view of a particulate matter sensor in which a sensor device is partially cutout in the first embodiment.
Figure 6:
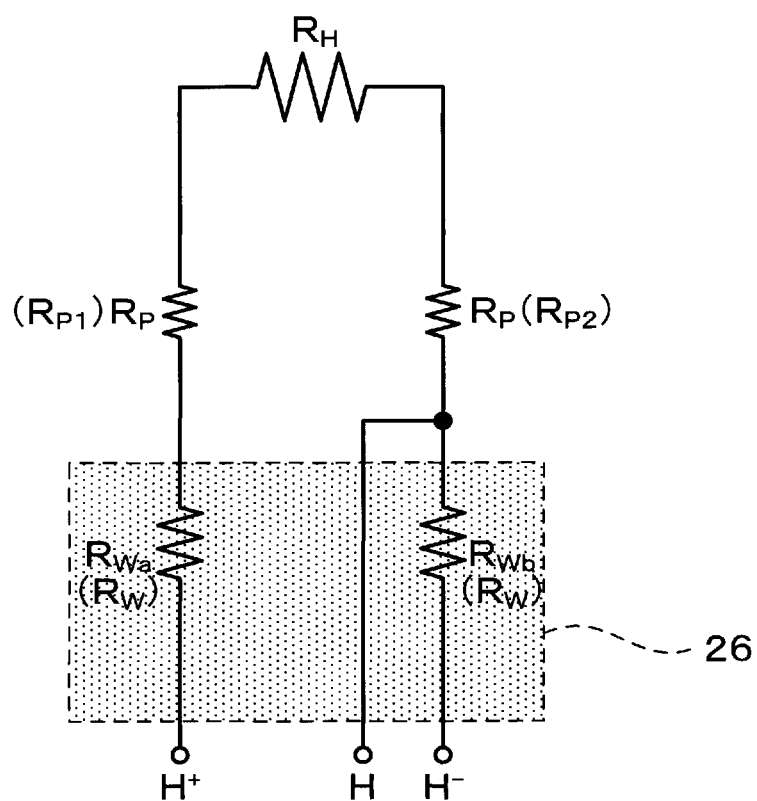
FIG. 6 is a view of an equivalent circuit of FIG. 5.

The heater 22, as can be seen in FIG. 5, is arranged outside the holding portion 26. The sensing line 24 is connected to the end portion 239 of the heater lead 23 closer to the heater 22. The joint 27 between the sensing line 24 and the heater lead 23 is located closer to the heater 22 than the holding portion 26 is.

Next, how to measure the total resistance Rs and the lead resistance Rwab will be described below. The control circuit 4 is, as illustrated in FIG. 2, equipped with a plurality of voltage-measuring portions 41 to 46. The first heater lead 23a that is a higher potential one of the heater leads 23 is connected to the first voltage-measuring portion 41. The second heater lead 23b that is a lower potential one of the heater leads 23 is connected to the second voltage-measuring portion 42. The control circuit 4 uses the first voltage-measuring portion 41 and the second voltage-measuring portion 42 to measure the voltage Vs between the ends 237 and 238 of the heater leads 23a and 23b. The control circuit 4 also uses the heater current measuring circuit 13 to measure the current i flowing through the heater 22. The total resistance Rs is calculated using equations below.

$$R_S = V_S/i \qquad (1)$$

$$= R_H + R_{wab}$$

$$= R_H + R_{wa} + R_{wab} \qquad (2)$$

where $R_{wa}$ is a resistance of the first heater lead 23a, and $R_{wb}$ is a resistance of the second heater lead 23b.

The sensing line 24 is, as illustrated in FIG. 2, connected to the third voltage-measuring portion 43. The control circuit 4 uses the third voltage-measuring portion 43 and the second voltage-measuring portion 42 to measure the voltage developed between the terminal 249 of the sensing line 24 and the terminal 238 of the second heater lead 23b. The current hardly flows through the sensing line 24, thus permitting a voltage drop at the sensing line 24 to be ignored. The voltage between the terminals 249 and 238 is, therefore, substantially equal to the voltage $V_w$ created between the joint 27 of the second heater lead 23b and the terminal 238. The control circuit 4 uses the heater current measuring circuit 13 to measure the current i flowing through the heater 22. The resistance $R_{wb}$ of the second heater lead 23b is, therefore, calculated using the voltage Vw and the current i according to equation below.

$$R_{wb} = V_w/i \qquad (3)$$

In this embodiment, the length of the first heater lead 23a is substantially equal to that of the second heater lead 23b, so that the resistances of the first heater leads 23a and the second heater lead 23b are substantially equal to each other. $R_{wa}$, thus, approximates $R_{wb}$ ($R_{wa} = R_{wb}$). Therefore, the above equation (2) may be changed to the following formula.

$$R_S = R_H + R_{wab} = R_H + 2R_{wb}$$

Rewriting Eq. (2), we obtain $$R_H = R_S - R_{wab} = R_S - 2R_{wb} \qquad (4)$$

This embodiment uses Eqs. (1) and (3) to determine $R_S$ and $R_{wb}$ and also uses Eq. (4) to calculate the heater resistance $R_H$. Specifically, the lead resistance Rwab ($=2R_{wb}$) is subtracted from the total resistance Rs to derive the heater resistance $R_H$.

Figure 7:
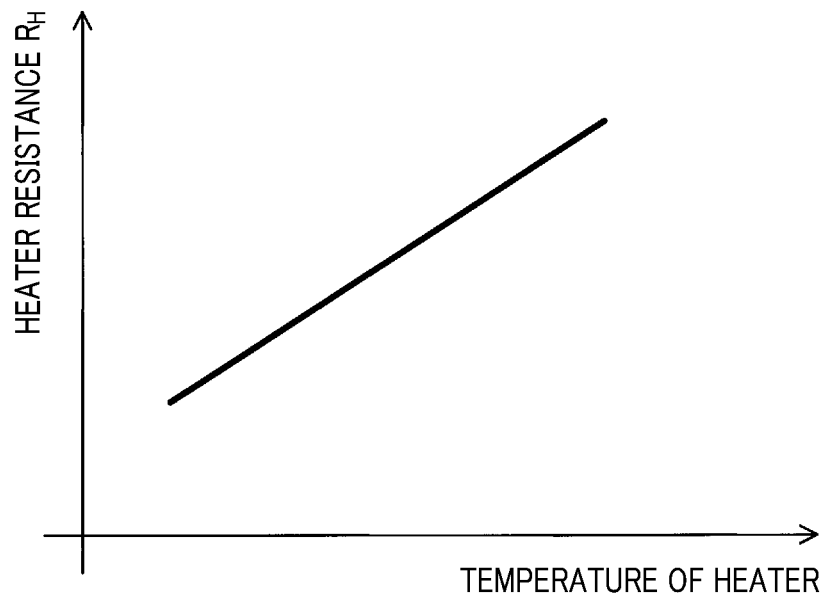
FIG. 7 is a graph which represents a relation between a heater resistance and the temperature of a heater.

The temperature of the heater 22 and the heater resistance $R_H$, as illustrated in FIG. 7, have a given relation therebetween. The temperature of the heater 22 is, thus, calculated by deriving the heater resistance $R_H$. In this embodiment, Eq. (4) is used to accurately calculate the heater resistance $R_H$ which does not contain the lead resistance Rwab, thereby ensuring the accuracy in determining the temperature of the heater 22.

Figure 9:
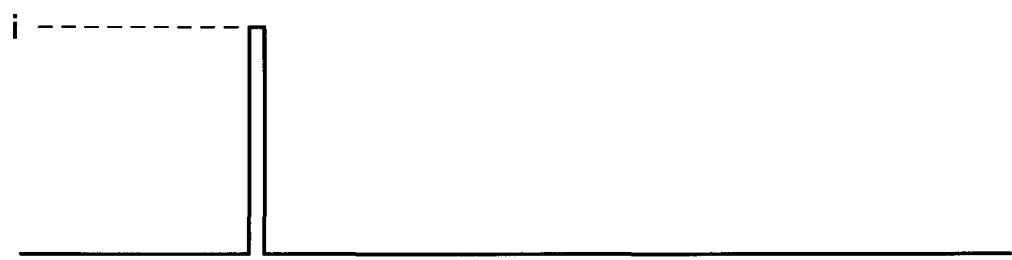
FIG. 9 is a view of a waveform of a heater current in a measuring mode in the first embodiment.

This embodiment calculates the heater resistance $R_H$ both in the measuring mode (see FIG. 1) and in the burning mode (see FIG. 2) and uses it to calculate the temperature of the heater 22. In the measuring mode, a duty cycle of the current i delivered to the heater 22 is, as illustrated in FIG. 9, set small, thereby preventing the heater 22 from producing a large amount of heat which burns off the particulate matter accumulated on the deposition portion 20. It is preferable in the measuring mode that the duty cycle of the current i is small. The greater the duty cycle, the more a rise in temperature of the deposition portion 20 is accelerated in the measuring mode, thereby disturbing the convergence of the particulate matter on the deposition portion 20. Specifically, the heat of the exhaust pipe 19 (see FIG. 4) in which the particulate matter sensor 2 is mounted is usually dissipated to air, so that the temperature of the exhaust pipe 19 is lower than that of the exhaust gas g. The temperature of the particulate matter sensor 2 installed in the exhaust pipe 19 is, thus, lower than that of the exhaust gas g. This causes a thermophoretic force to act on the particulate matter contained in the high-temperature exhaust gas to urge it toward the deposition portion 20 of the particulate matter sensor 2. In the measuring mode, the thermophoretic force is used to collect the particulate matter on the deposition portion 20. Accordingly, when the duty cycle of the current i is increased, so that the temperature of the deposition portion 20 becomes excessively high, it will cause a difference in temperature between the exhaust gas and the deposition portion 20 to become small, thus resulting in a decrease in thermopheretic force, which disturbs the convergence of the particulate matter on the deposition portion 20. For these reasons, in the measuring mode, the duty cycle is preferably set small to have the temperature of the deposition portion 20 lower than that of the exhaust gas. It is advisable that the duty cycle in the measuring mode be set lower than or equal to 1%. It is also advisable that in the measuring mode that the duty be set low so as to prevent the temperature of the deposition portion 20 from being higher by 30° C. or more than that when the heater 22 is fully deneergized.

Figure 8:
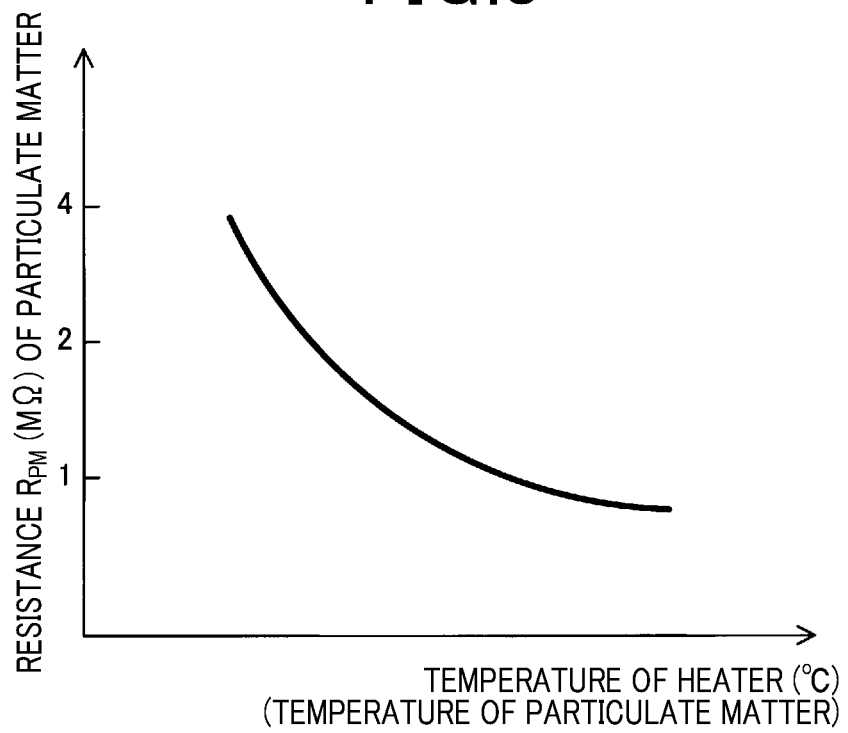
FIG. 8 is a graph which represents a relation between a resistance of particulate matter and a temperature of the particulate matter in the first embodiment.

The resistance $R_{PM}$ of the particulate matter and the temperature of the heater 22, as illustrated in FIG. 8, has a given relation therebetween. When the temperature of the heater 22, that is the temperature of the particulate matter rises, it will result in a drop in the resistance $R_{PM}$ of the particulate matter. The control circuit 4 measures the current I flowing between the electrodes 21a and 21b (see FIG. 1) in the measuring mode and uses it to calculate the resistance $R_{PM}$ of the particulate matter accumulated between the electrodes 21a and 21b. The control circuit 4 then corrects the resistance $R_{PM}$ using the temperature of the heater 22 and uses the corrected value of the resistance $R_{PM}$ to determine the amount of the particulate matter in the exhaust gas.

Figure 10:
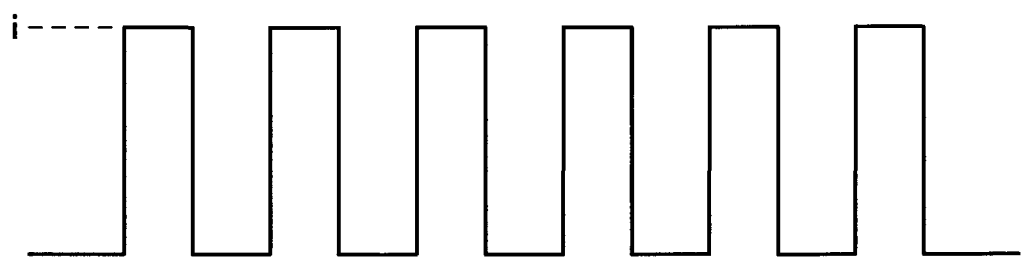
FIG. 10 is a view of a heater current in a burning mode in the first embodiment.

The duty cycle of the current i in the burning mode is, as illustrated in FIG. 10, set greater than that in the measuring mode. This embodiment calculates the resistance $R_{PM}$ in the burning mode and uses it to determine the temperature of the heater 22. This embodiment then controls the amount of current i delivered to the heater 22 to bring the temperature of the heater 22 to fall in a given range. In other words, this embodiment controls the duty cycle of the current i.

Next, how to measure the resistance $R_{PM}$ of the particular matter accumulated between the electrodes 21a and 21b in the measuring mode will be described below. This embodiment, as illustrated in FIG. 1, measures the current I flowing between the electrodes 21a and 21b using the current measuring portion 3 in the measuring mode and then calculates the resistance $R_{PM}$ of the particular matter using the measured value of the current I and the voltage (Vt−Va) appearing between the electrodes 21a and 21b according to the following equation.

$$R_{PM}=(Vt-Va)/I$$

where Vt is voltage at the high-voltage circuit 11, i.e., voltage at the first electrode 21a, and Va is voltage at the inverting input terminal 39 of an operational amplifier OP, i.e., voltage at the second electrode 21b.

The current measuring portion 3 is equipped with the current-voltage conversion circuit 31 and the voltage measuring portion 45. The current-voltage conversion circuit 31 is made up of an operational amplifier OP and a resistor r. The resistor r connects between the inverting input terminal 39 and the output terminal 37 of the operational amplifier OP. The voltage at the non-inverting input terminal 38 of the operational amplifier OP is kept at a constant voltage Va. The virtual short that is the attribute of the operational amplifier OP causes the voltage at the inverting input terminal 39 to be substantially equal to the voltage Va at the non-inverting input terminal 38.

In the measuring mode, the control circuit 4 turns on the switch 6, thereby connecting the first electrode 21a to the high-voltage circuit 11, so that the voltage is applied between the electrodes 21a and 21b. This causes the current I to flow through the particulate matter when accumulated between the electrodes 21a and 21b. The current I does not flow to the inverting input terminal 39 of the operational amplifier OP, but passes through the resistor r. This causes the output voltage Vo at the operational amplifier OP to drop to be lower than the voltage Va at the non-inverting input terminal 38 by rI. Specifically, the output voltage Vo is given by $$Vo=Va-rI.$$

From the above, the current I is expressed by equation (5) below.

$$I=(Va-Vo)/r \qquad (5)$$

The control circuit 4 records values of Va and r therein and measures the output voltage Vo using the voltage measuring portion 45. The control circuit 4 calculates the current I according to Eq. (5) and uses the current I to determine the resistance $R_{PM}$ of the particulate matter accumulated between the electrodes 21a and 21b.

The sub-current measuring portion 3' formed on the control circuit 4 has the same structure as that of the current measuring portion 3.

Next an operation of the particulate matter sensing system 1 in the burning mode will be described below. In the burning mode, as illustrated in FIG. 2, the control circuit 4 turns off the switch 6 to disconnect the first electrode 21a from the high-voltage circuit 11, so that the voltage appearing between the electrodes 21a and 21b will be substantially 0V.

In the burning mode, the control circuit 4 PWM-controls the heater driver circuit 12 to produce a flow of current i through the heater 22. The control circuit 4, as described above, measures the heater resistance $R_H$ and uses it to calculate the temperature of the heater 22. The control circuit 4 controls the amount of current I delivered to the heater 22 to bring the temperature of the heater 22 to within a given range.

When the heater 22 produces heat, it will cause the temperature of the insulating plate 25 of the sensor device 29 to increase (see FIG. 3), thus resulting in a drop in resistance of the insulating plate 25, so that the leakage current $I_L$ flows from the heater 22 to the electrodes 21a and 21b. The leakage current $I_L$ is measured using the two current measuring portions 3 and 3'. The control circuit 4 uses the measured leakage current $I_L$ to determine whether the particulate matter sensor 2 is malfunctioning or not. For instance, when the electrode leads 219 are disconnected, the current measuring portion 3 and 3' measure the leakage current $I_L$, while when the electrode leads 219 are disconnected, it will cause the leakage current $I_L$ not to be measured. Accordingly, when the measured value of the leakage current $I_L$ is less than a given value, the control circuit 4 concludes that the electrode leads 219 are broken. When the insulating plate 25 has been deteriorated, it will facilitate the ease with which the leakage current $I_L$ flows. Therefore, when the value of the leakage current $I_L$ is higher than a given value, the control circuit 4 concludes that the insulating plate 25 has been deteriorated.

The operation and beneficial advantages of this embodiment will be described below. The particulate matter sensor 2 has the sensing line 24 to which is one (i.e., the second heater lead 23b) of the heater leads 23 connected for measuring the resistance Rw ($R_{wb}$) of the one of the heater leads 23.

The measurement of the resistance Rw ($R_{wb}$) of the heater lead 23 (i.e., the second heater lead 23b) is therefore, be achieved by using the sensing line 24, thereby enabling the lead resistance Rwab ($=2R_{wb}$) that is the sum of the resistances Rw ($R_{wa}$ and $R_{wb}$) of the respective heater leads 23a and 23b to be determined. In this embodiment, the voltage is applied between the heater leads 23a and 23b to measure the total resistance Rs. The particulate matter sensor 2 of this embodiment is, as described above, capable of calculating the lead resistance Rwab. The calculated lead resistance Rwab is, therefore, subtracted from the measured total resistance Rs to accurately derive the heater resistance $R_H$ from which the lead resistance Rwab that is a factor for an error is removed. The temperature of the heater 22 is, therefore, calculated accurately using the heater resistance $R_H$.

Similarly, the particulate matter sensing system 1 is capable of determining the heater resistance $R_H$ using the control circuit 4 and using it to accurately calculate the temperature of the heater 22.

In this embodiment, the terminal 8 of a lead acid storage battery is, as illustrated in FIG. 1, connected to the heater lead 23. The voltage VB at the lead acid storage battery is relatively low, about 14V. In order to have the heater 22 produce heat using the lead acid storage battery, it is, thus, necessary to decrease the resistance of the heater 22 to allow the current i to sufficiently flow therethrough, so that the resistance (i.e., the head resistance Rwab) of the heater leads 23 will be a value not negligible as compared with the resistance (i.e., the heater resistance $R_H$) of the heater 22. Consequently, this embodiment subtracts the lead resistance Rwab from the total resistance Rs to accurately determine the heater resistance $R_H$.

The use of the structure of this embodiment enables the temperature of the heater 22 to be determined without use of a special temperature sensor. This results in a decrease in production cost of the particulate matter sensor 2 and the particulate matter sensing system 1.

The joint 27 between the sensing line 24 and the heater leads 23 is, as illustrated in FIG. 5, arranged closer to the heater 22 than the holding portion 26 is. The joint 27 is, therefore, located outside the holding portion 26, thereby resulting in increased accuracy in measuring the temperature of the heater 22. Specifically, the intervening portions 235 that are portions of the heater leads 23 lie between the joint 27 and the heater 22. The calculated value of the heater resistance $R_H$, as described above, contains resistances $R_P$ (see FIG. 6) of the intervening portions 235. When the temperature of the intervening portion 235 greatly deviates from that of the heater 22, it, therefore, becomes a factor for an error of the resistances $R_P$ of the intervening portions 235, which results in a loss of accuracy in calculating the temperature of the heater 22. The accuracy in calculating the temperature of the heater 22 is, thus, ensured by bringing the temperature of the intervening portions 235 to be substantially equal to that of the heater 22.

In this embodiment, the joint 27 is, as illustrated in FIG. 5, disposed outside the holding portion 26. The joint 27 is located closer to the heater 22 than the holding portion 26 is. The intervening portions 235, therefore, do not lie in the holding portion 26. The thermal capacity of the holding portion 26 is great, so that the temperature of the holding portion 26 is difficult to change. The heater 22 is not surrounded by the holding portion 26, so that the temperature of the heater 22 easily changes. The deviation of the temperature of the intervening portions 235 from that of the heater 22 is minimized by arranging the intervening portions 235 closer to the heater 22 than the holding portion 26 is without locating them inside the holding portion 26, thereby bringing the temperature of the intervening portions 235 to be substantially equal to that of the heater 22. This eliminates a risk that the resistor $R_P$ of the intervening portion 235 will cause errors in calculating the temperature of the heater 22.

In this embodiment, the heater 22 is higher in resistance than each of the heater leads 23a and 23b. Specifically, $R_H > R_{wb} \cong R_{wa}$. This improves the efficiency of the heater 22 in producing heat. The above resistance of the heater 22 is a resistance when the temperature of the heater 22 is equal to that of the heater leads 23.

The control circuit 4 of this embodiment is designed to correct the measured value of the resistance $R_{PM}$ of the particulate matter accumulated between the electrodes 21a and 21b using the temperature of the heater 22 and calculate the amount of the particulate matter contained in the exhaust gas using the corrected value in the measuring mode. The resistance $R_{PM}$ of the particulate matter, as illustrated in FIG. 8, depends upon the temperature thereof. The amount of the particulate matter in the exhaust gas is, therefore, derived accurately by correcting the resistance $R_{PM}$ of the particulate matter using the temperature of the heater 22, i.e., the temperature of the particulate matter.

The control circuit 4 in this embodiment is designed to control the current i delivered to the heater 22 to bring the calculated temperature of the heater 22 to within the given range in the burning mode. This minimizes a risk that the service life of the heater 22 is decreased due to an excessive increase in temperature of the heater 22 or a decrease in temperature of the heater 22 results in a lack in burning off the particulate matter.

As apparent from the above discussion, this embodiment provides the particulate matter sensor and the particulate matter sensing system using the particulate matter sensor which are capable of decreasing the production costs thereof and accurately measuring the temperature of the heater.

In this embodiment, the particulate matter sensor 2 and the control circuit 4 are mounted in the diesel powered vehicle, but however, may be installed in gasoline powered vehicles.

Second Embodiment

In the following embodiments, the same reference numbers used in the drawings as those in the first embodiment represent the same parts as in the first embodiment unless otherwise specified.

Figure 11:
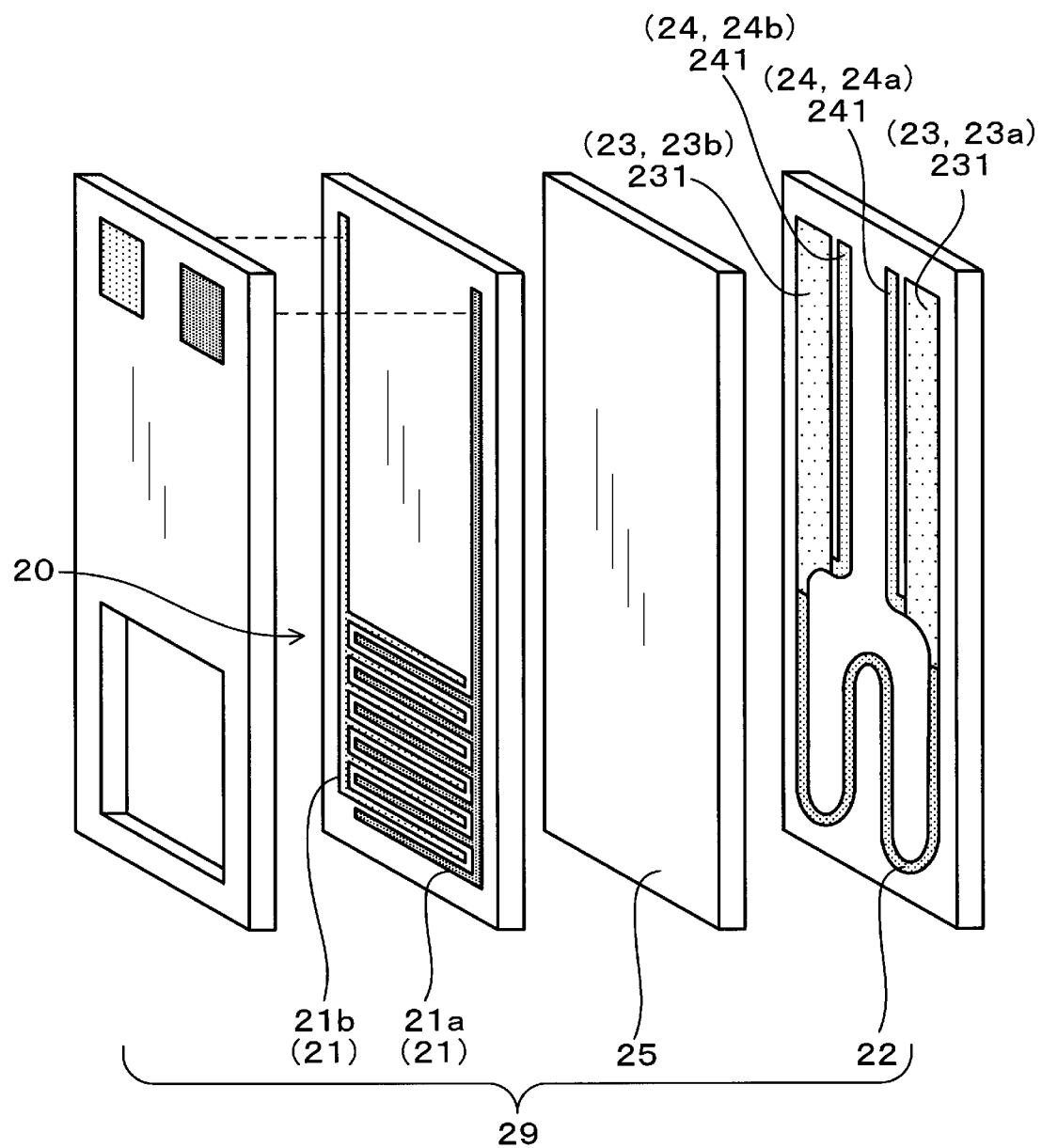
FIG. 11 is an exploded perspective view of a particulate matter sensor in the second embodiment.
Figure 12:
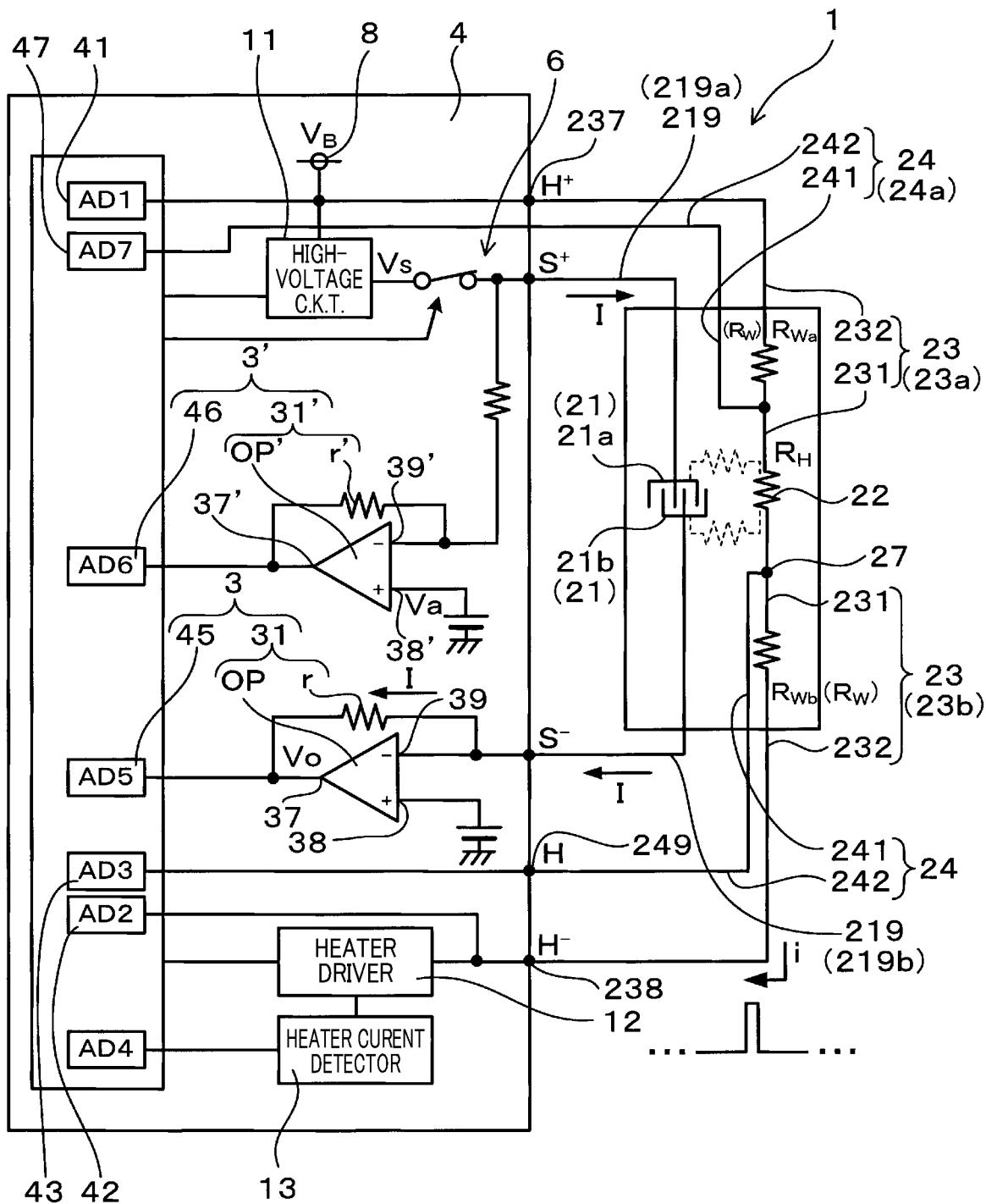
FIG. 12 is a circuit diagram of a particulate matter sensing system in the second embodiment.

This embodiment is an example of a modified structure of the particulate matter sensor 2. The sensing lines 24 (24a, 24b) are, as illustrated in FIGS. 11 and 12, connected to the heater leads 23a and 23b, respectively. The control circuit 4 uses the sensing lines 24a and 24b to measure the resistances $R_{wa}$ and $R_{wb}$ of the two heater leads 23a and 23b and calculates the lead resistance Rwab according to an equation below.

$$Rwab = R_{wa} + R_{wb}$$

Specifically, the sum of the resistances $R_{wa}$ and $R_{wb}$ of the two heater leads 23a and 23b is defined as the lead resistance Rwab.

This embodiment, like in the first embodiment, measures the total resistance Rs ($=R_H+$Rwab) and calculates the heater resistance $R_H$ using an equation (6) below.

$$R_H = R_s - Rwab = R_S - R_{wa} - R_{wb} \quad (6)$$

The above way enables the heater resistance $R_H$ to be determined to accurately calculate the temperature of the heater 22 even if the resistance $R_{wa}$ of the first heater lead 23a is different from the resistance $R_{wb}$ of the second heater lead 23b.

The second embodiment has the same other arrangements and beneficial advantages as those in the first embodiment.

Third Embodiment

Figure 13:
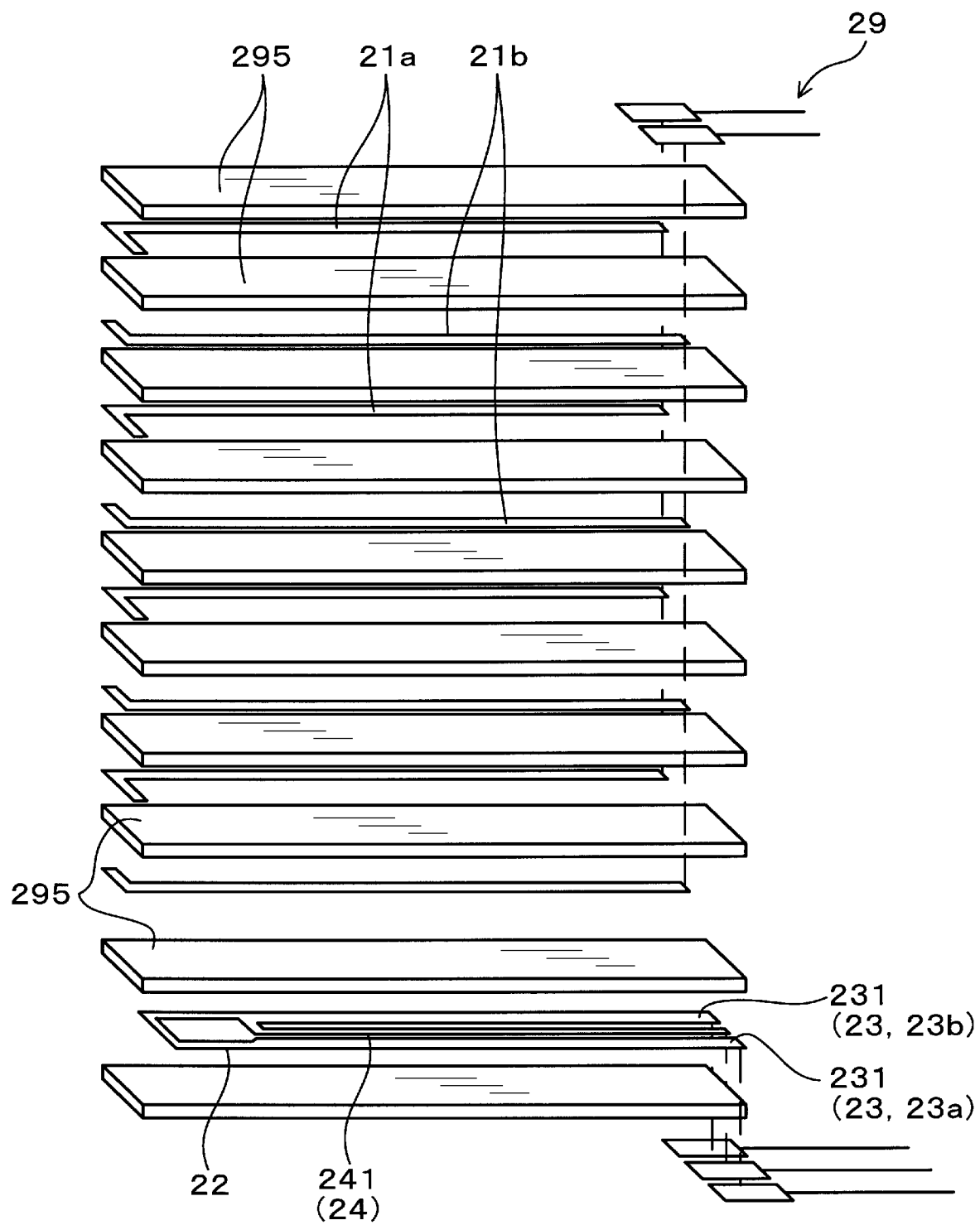
FIG. 13 is an exploded perspective view of a particulate matter sensor in the third embodiment.
Figure 14:
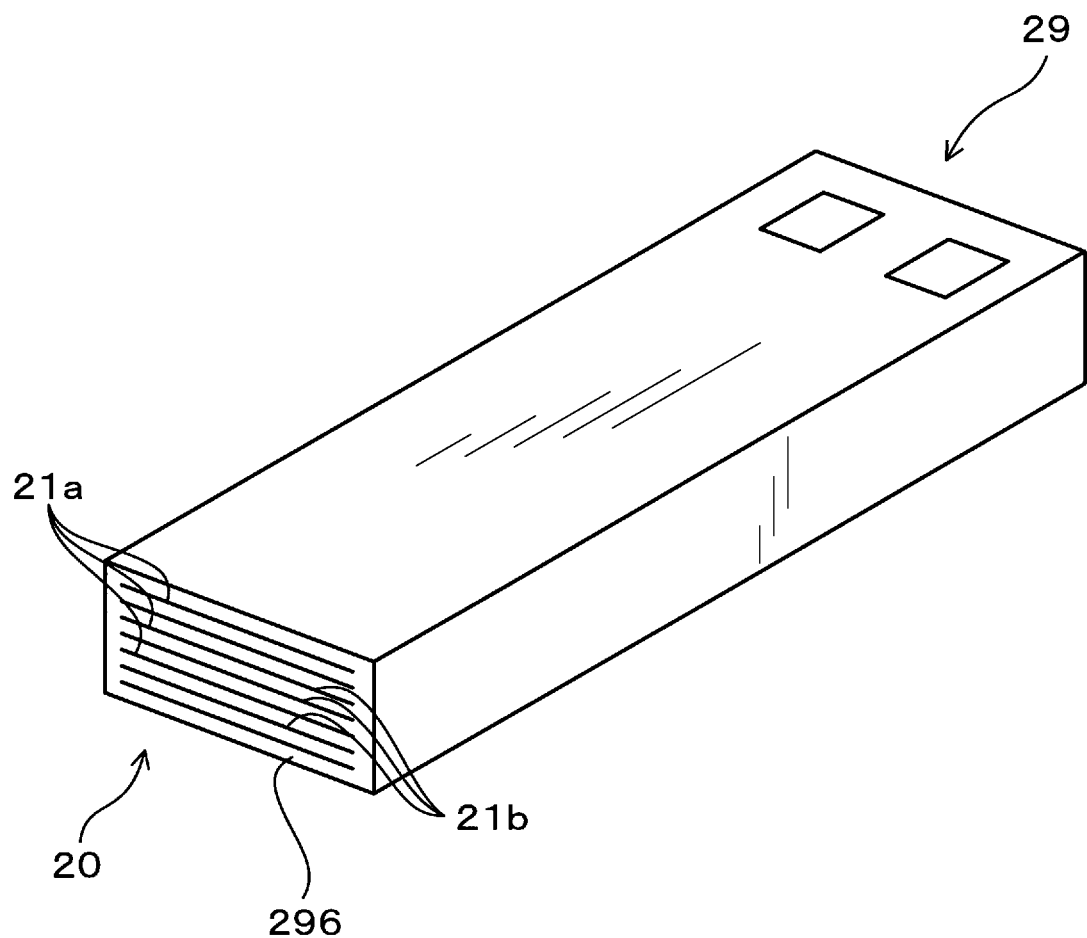
FIG. 14 is a perspective view of a particulate matter sensor in the third embodiment.

This embodiment is a modification of the structure of the sensor device 29. The sensor device 29 of this embodiment, as illustrated in FIG. 13, includes a plurality of ceramic insulating thin plates 295. The first electrodes 21a and the second electrodes 21b are disposed between the insulating thin plates 295. The first electrodes 21a and the second electrodes 21b are, as illustrated in FIG. 14, exposed outside the end surface 296 of the sensor device 29. The end surface 296 is designed to accumulate particulate matter thereon.

Like in the first embodiment, the sensor device 29 of this embodiment is, as illustrated in FIG. 13, equipped with the heater 22 and a pair of heater leads 23a and 23b. The sensing line 24 is connected to the second heater lead 23b. The control circuit 4 uses the sensing line 24 to measure the resistance $R_{wb}$ of the second heater leads 23 and uses the resistance $R_{wb}$ to determine the lead resistance Rwab ($=2R_{wb}$).

This embodiment has the same other arrangements and beneficial advantages as those in the first embodiment.

Fourth Embodiment

This embodiment is an example of a modification of how to calculate the temperature of the heater 22. The heater 22 is known to be aged by use for a long time, which will lead to an increased value of the heater resistance $R_H$. This is because the long use of the particulate matter sensor 2 causes metallic atoms, such as Pt, of the heater 22 to be aggregated by heat of the heater 22.

Figure 15:
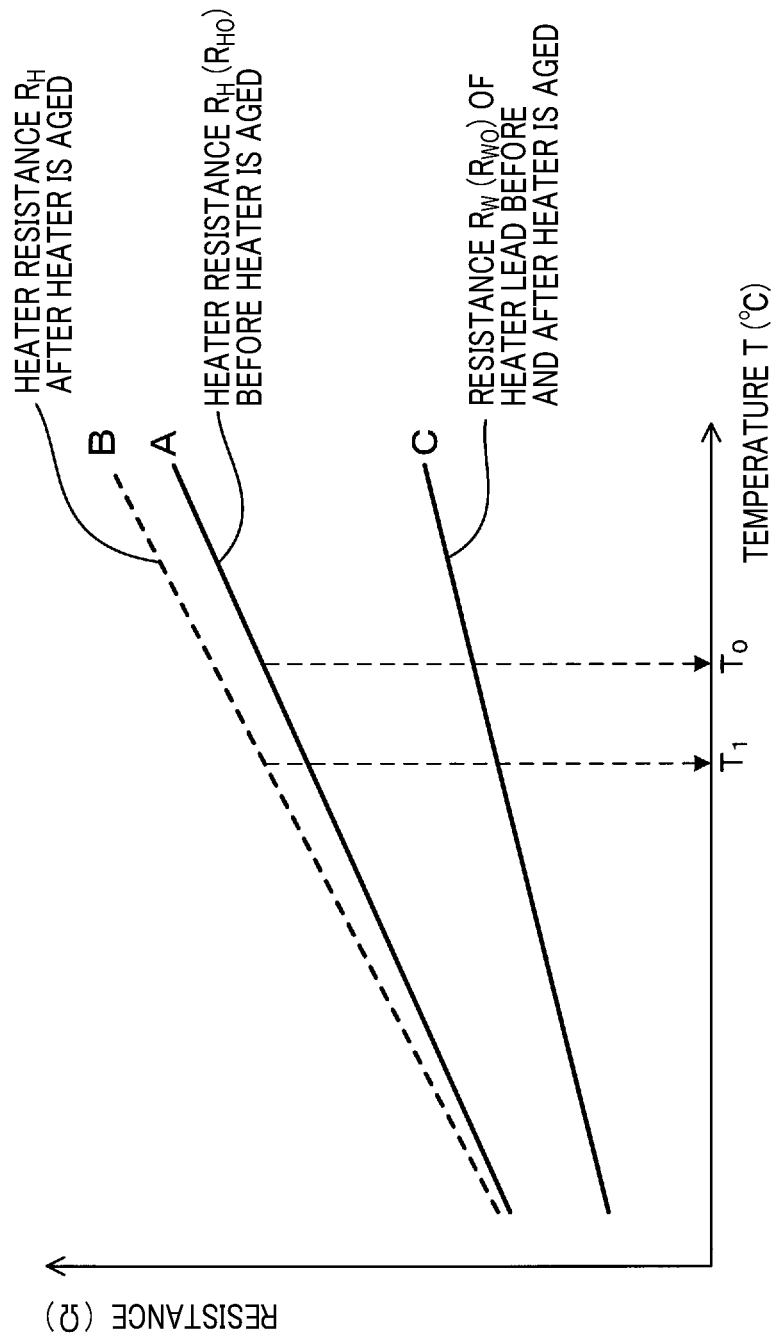
FIG. 15 is a graph which shows a relation between a temperature of a heater and a heater resistance in the fourth embodiment.

FIG. 15 represents relations between the heater resistance $R_H$ and the temperature T before and after the heater 22 is aged. FIG. 15 also represents a relation between the resistance $R_w$ of the heater leads 23 and the temperature T before and after the heater 22 is aged. The graph shows that the relations between the heater resistance $R_H$ and the temperature T are expressed in the form of a linear function. The function B before the heater 22 is aged has a slope greater than that of the function A after the heater 22 is aged. When the heater 22 has been aged, the use of the function A, thus, results in decreased accuracy in calculating the temperature T of the heater 22. In order to accurately determine the temperature T of the heater 22, it is, therefore, necessary to derive the function B after the heater 22 is aged to use it in calculating the temperature T.

How to derive the function B after the heater 22 is aged will be described below. The function A before the heater 22 is aged is expressed below.

$$R_{HO} = a + bT$$

Where $R_{HO}$ is the heater resistance $R_H$ (i.e., an initial heater resistance $R_{HO}$) before the heater 22 is aged, and a and b are constants. The control circuit 4 stores the constants a and b therein.

The function B after the heater 22 is aged is given by multiplying the function A before the heater 22 is aged by an aging rate k. Specifically, it is expressed as $$R_H = k(a + bT) \quad (6)$$

Note that the aging rate k is greater than one. The function B is provided by deriving the aging rate k, thereby enabling the temperature of the heater 22 to be accurately calculated.

This embodiment calculates the aging rate k in the following way. First, immediately after the particulate matter sensing system 1 is produced, in other words, before the heater 22 is aged, the heater 22 and the heater leads 23 are placed at the same temperature (e.g., temperature $T_O$). The initial heater resistance $R_{HO}$ and the resistance $R_w$ of the heater leads 23 (i.e., an initial lead resistance $R_{WO}$) are then measured and stored in the control circuit 4.

After the particulate matter sensing system 1 is mounted in the vehicle and shipped, the control circuit 4 periodically measures the heater resistance $R_H$ and the resistance $R_w$ of the heater leads 23. Such measurement is achieved by the control circuit 4 after a lapse of a given period of time since the engine of the vehicle was stopped. In other words, the heater 22 and the heater leads 23 are placed at the same temperature (e.g., the temperature $T_1$), and then the resistors $R_H$ and $R_w$ are measured.

The function C of the resistance $R_w$ of the heater leads 23 and the temperature T is, as illustrated in FIG. 15, hardly changed even if the heater 22 is aged. This is because when the particulate matter sensor 2 is in use, the temperature of the heater 22 becomes high, but the temperature of the heater leads 23 is relatively low, so that metallic atoms of the heater leads 23 are hardly aggregated.

After measuring the resistances $R_H$ and $R_w$, the control circuit 4 calculates the aging rate k using an equation (7) below.

$$k = (R_H/R_w)/(R_{HO}/R_{WO}) \quad (7)$$

The temperature $T_1$ of the heater 22 and the heater leads 23 at which the resistances $R_H$ and $R_w$ after the heater 22 is aged are measured may be different from the temperature $T_0$ at which the initial resistances $R_{HO}$ and $R_{WO}$ before the heater 22 is aged are measured. A numerator $R_H/R_w$ of Eq. (7) is substantially constant regardless of the measured temperature. The value of $R_H/R_w$ may, therefore, be viewed as being derived at the same temperature $T_0$ as that at which the initial resistances $R_{HO}$ and $R_{WO}$ are measured. The heater leads 23 are, as described above, hardly changed, so that the resistances $R_w$ and $R_{wo}$, as derived at the same temperature T0, are hardly different from each other. Thus, $R_{wo}/R_w=1$. Eq. (7) may, therefore, be rewritten as $$k=(R_H/R_{HO})\times(R_{WO}/R_W)=R_H/R_{HO}$$

This shows that the aging rate k, as calculated by Eq. (7), represents a rate of increase in the heater resistance $R_H$ after the heater 22 is aged from the initial heater resistance $R_{HO}$ and that the use of Eq. (7) enables the aging rate k to be calculated even if the measurement temperature $T_1$ at which the resistors $R_H$ and $R_W$ after the heater 22 aged are measured is different from the measurement temperature $T_0$ at which the initial resistances $R_{HO}$ and $R_{WO}$ are measured.

If the aging rate k ($=R_H/R_{HO}$) is calculated using the initial heater resistance $R_{HO}$ and the measured value of the heater resistance $R_H$ after the heater 22 is aged without use of Eq. (7), it may result in a failure in accurately calculating the aging rate k since there is a probability that the initial heater resistance $R_{HO}$ and the heater resistance $R_H$ are not measured at the same temperature. The use of Eq. (7), however, enables the aging rate k to be accurately derived even if the measured temperatures are different from each other.

By calculating the aging rate k, the function B in FIG. 15, that is, Eq. (6) is derived. Rewriting Eq. (6), an equation (8) below is derived.

$$T=(R_H/k-a)/b \quad (8)$$

In this embodiment, the heater resistance $R_H$ is, as described in the first embodiment, determined in the measuring mode and the burning mode. The temperature T of the heater 22 is then calculated according to Eq. (8). This enables the temperature of the heater 22 to be accurately calculated even when the heater 22 has been aged.

Figure 16:
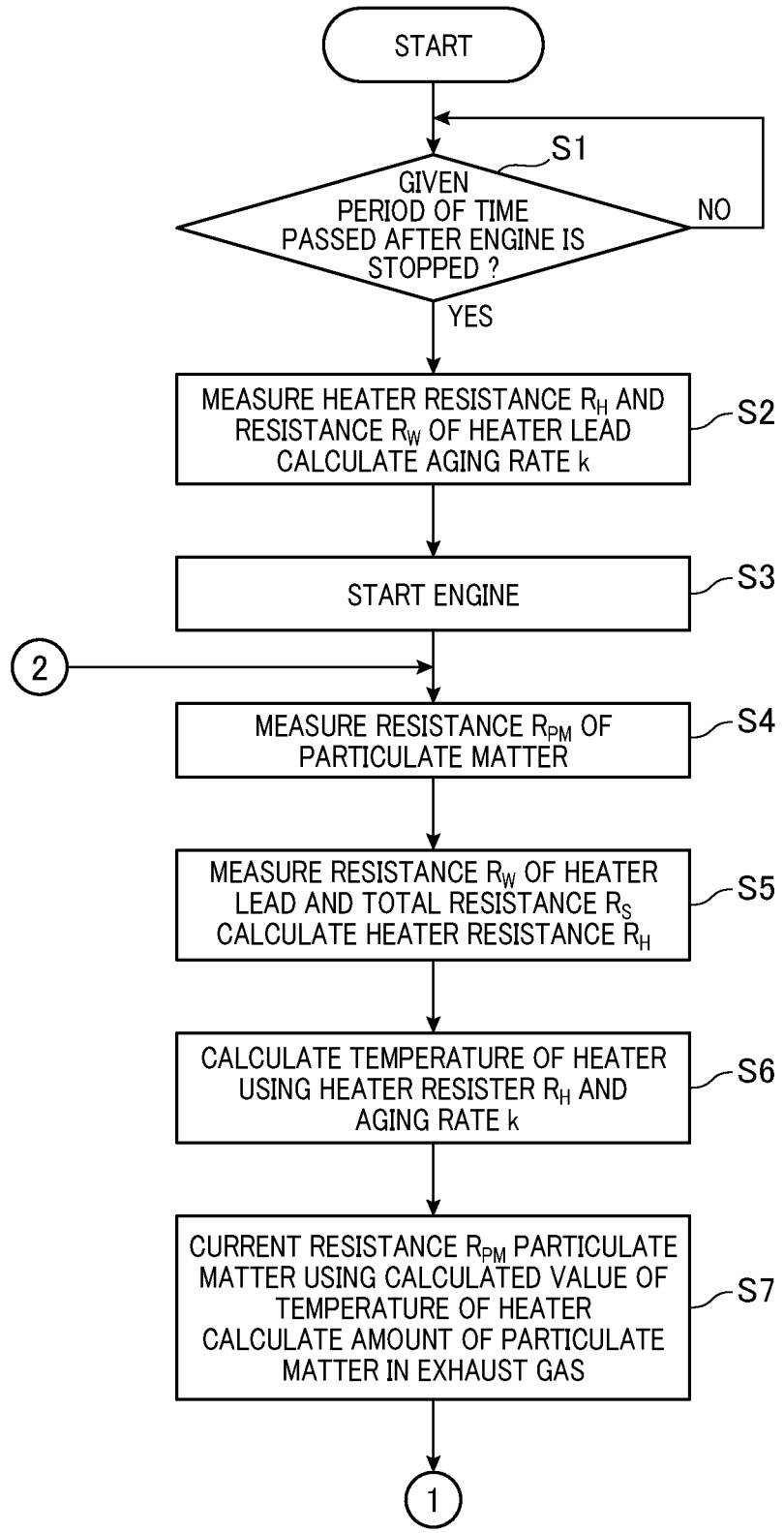
FIG. 16 is a flowchart in a particulate matter sensing system in the fourth embodiment.

A flowchart executed by the control circuit 4 will be described below. This embodiment, as illustrated in FIG. 16, performs an aging rate calculating mode (steps S1 and S2), the measuring mode (steps S4 to S8), and the burning mode (steps S9 to S13). When the aging rate calculating mode is entered, the routine proceeds to step S1 wherein the control circuit 4 determines whether a given period of time has passed since the engine was stopped or not. If a YES answer is obtained, then the routine proceeds to step S2 wherein the heater resistance $R_H$ and the resistance $R_w$ of the heater leads 23 are measured. The aging rate k is then calculated according to Eq. (7).

Subsequently, the routine proceeds to step S3 wherein the engine is started. The routine proceeds to step S4 wherein the resistance $R_{PM}$ of the particulate matter is measured using the particulate matter sensor 2. The routine proceeds to step S5 wherein the resistance $R_w$ of each of the heater leads 23 and the total resistance Rs are determined. The lead resistance Rwab ($=2R_w$) is subtracted from the total resistance Rs to determine the heater resistance $R_H$.

Afterwards, the routine proceeds to step S6 wherein the heater resistance $R_H$ and the aging rate k are used to calculate the temperature T of the heater 22 according to Eq. (8). The routine proceeds to step S7 wherein the temperature T of the heater 22 is used to correct the measured value of the resistance $R_{PM}$ of the particulate matter and then calculate the amount of particulate matter contained in the exhaust gas.

Figure 17:
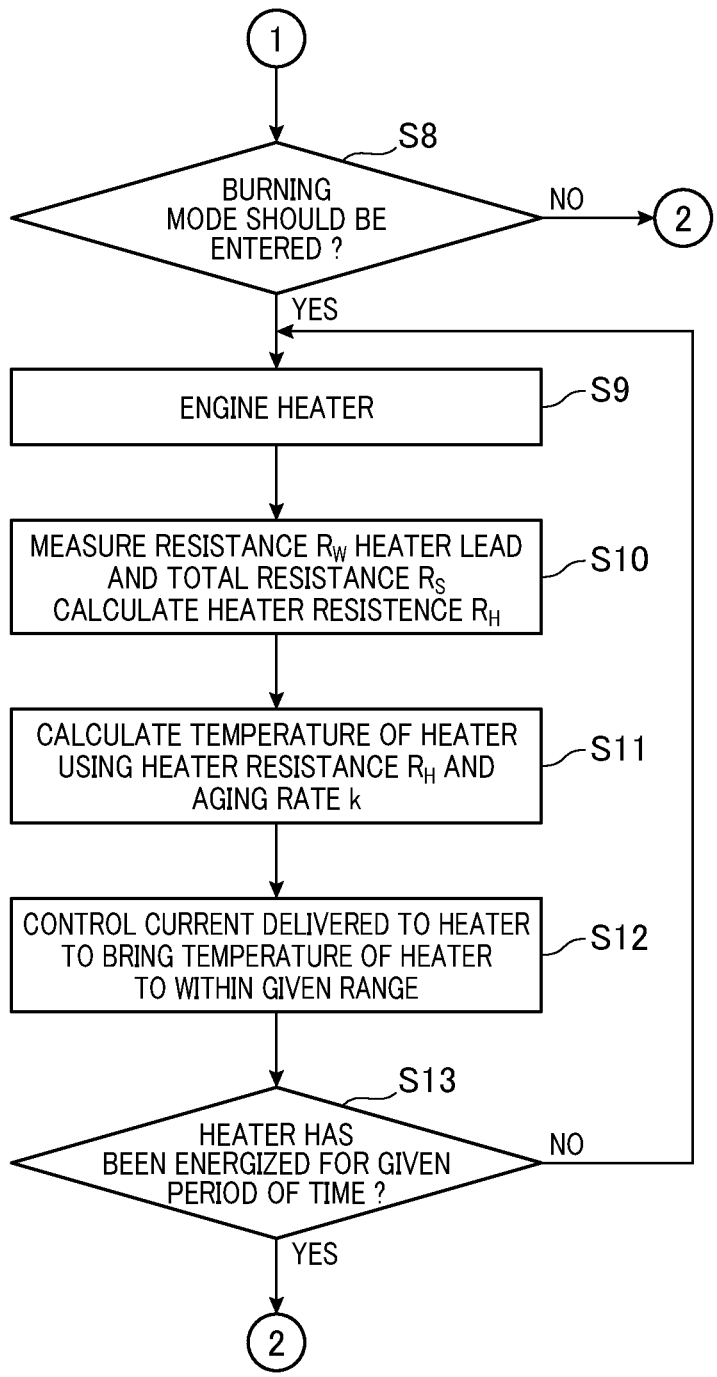
FIG. 17 is a flowchart of a process following that of FIG. 16.

Subsequently, the routine proceeds to step S8 in FIG. 17 wherein it is determined whether the burning mode should be entered or not. For example, when the current flowing between the electrodes 21 of the particulate matter sensor 2 is saturated, it is determined that the burning mode should be entered.

If a YES answer is obtained in step S8, then the routine proceeds to step S9 wherein the heater 22 is energized to produce heat, thereby burning off the particulate matter accumulated between the electrodes 21. The routine then proceeds to step S10 wherein the resistance $R_w$ of the heater head 23 and the total resistance Rs are measured. The lead resistance Rwab ($=2R_w$) is subtracted from the total resistance Rs to determine the heater resistance $R_H$. The routine then proceeds to step S11 wherein the heater resistance $R_H$ and the aging rate k are used to calculate the temperature T of the heater 22 according to Eq. (8).

Subsequently, the routine proceeds to step S12 wherein the amount of current delivered to the heater 22 is controlled to bring the temperature T of the heater 22 to within a preselected range. The routine proceeds to step S13 wherein it is determined whether the heater 22 has been energized for a given period of time or not. If a YES answer is obtained meaning that the particulate matter deposited between the electrodes 21 has been fully burned off, then the routine returns back to step S4 to enter the measuring mode.

The operation and beneficial effects of this embodiment will be described below. The control circuit 4, as described above, performs the aging rate calculating mode (steps S1 and S2). Specifically, after a lapse of a given period of time since the engine was stopped the control circuit 4 measures the resistance $R_w$ of the heater lead 23 and the heater resistance $R_H$ and then calculates the aging rate k according to Eq. (7). Subsequently, in the measuring mode (steps S4 to S8) and the burning mode (steps S9 to S13), the control circuit 4 uses the heater resistance $R_H$ and the aging rate k to calculate the temperature T of the heater 22 (steps S6 and S11). This enables the temperature T of the heater 22 to be accurately derived even if the heater 22 is deteriorated with age. It is, thus, possible to accurately determine the amount of particulate matter in the exhaust gas in the measuring mode or accurately control the temperature of the heater 22 in the burning mode.

Other arrangements and beneficial advantages are identical with those in the first embodiment.

This embodiment calculates the temperature T of the heater 22 using the heater resistance $R_H$ and the aging rate k in each of the measuring mode and the burning mode, but may not be limited thereto. This embodiment may calculate the temperature T of the heater only in one of the measuring mode and the burning mode.

Fifth Embodiment

Figure 18:
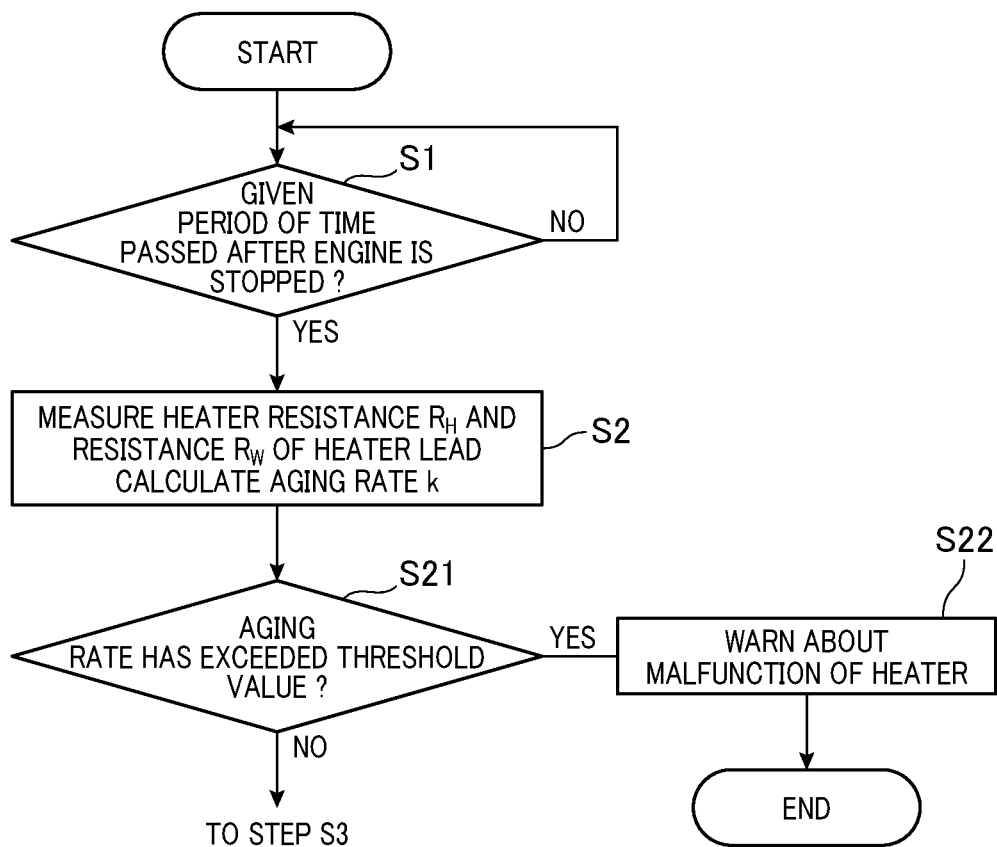
FIG. 18 is a portion of a flowchart in a particulate matter sensing system in the fifth embodiment.

This embodiment is a modification of the flowchart executed in the control circuit 4. Like in the fourth embodiment, the control circuit 4 of this embodiment, as illustrated in FIG. 18, performs the aging rate calculating mode (Steps S1 and S2). After completion of the operation in step S2, the routine proceeds to step S21 wherein it is determined whether the aging rate k has exceeded a given threshold value or not. If a YES answer is obtained, it is concluded that the heater 22 is malfunctioning. The routine then proceeds to step S22 wherein users are informed of the fact that the heater 22 is malfunctioning. Alternatively, if a NO answer is obtained in step S21, then the routine proceeds to step S3

(see FIG. 16). Steps S3 to S13 are identical with those in the fourth embodiment, and explanation thereof in detail will be omitted here.

The operation and beneficial effects in this embodiment will be described below. When the aging rate k has exceeded the given threshold value, users are informed of the fact that the heater 22 is malfunctioning (Steps S21 and S22). This enables the users to quickly perceive the malfunctioning of the heater 22 to replace the particulate matter sensor 2 with a new one.

Other arrangements and beneficial advantages are identical with those in the fourth embodiment.

This embodiment, like in the fourth embodiment, uses the aging rate k to calculate the temperature of the heater 22, but may not be limited thereto. The aging rate k may be used only in diagnosing the heater 22.

The invention claimed is:

1. A particulate matter sensing system comprising:
a particulate matter sensor; and
a control circuit wherein:
the particulate matter sensor comprises:
a deposition portion on which particulate matter in exhaust gas is permitted to be accumulated;
a pair of electrodes which are disposed on the deposition portion and are separate from each other;
a heater which heats the deposition portion; and
a pair of heater leads which are connected to the heater and define a path through which an electrical current is delivered to the heater;
a sensing line is connected to at least one of the heater leads to measure a resistance of the one of the heater leads;
the control circuit is connected to the particulate matter sensor, the control circuit selectively operates in a measuring mode and a burning mode, the measuring mode being to measure a resistance ($R_{PM}$) of the particulate matter accumulated between the electrodes and calculate an amount of the particulate matter in the exhaust gas using the measured resistance, the burning mode being to energize the heater to produce heat to burn off the particulate matter accumulated on the deposition portion), wherein in at least one of the measuring mode and the burning mode, the control circuit uses a resistance ($R_w$) of the heater leads, as measured using the sensing line, to calculate a lead resistance (Rwab) that is sum of the resistances ($R_w$) of the respective heater leads and also determine a total resistance (Rs) that is sum of a heater resistance ($R_H$) of the heater and the lead resistance (Rwab), the control circuit also subtracting the lead resistance (Rwab) from the total resistance (Rs) to derive the heater resistance ($R_H$) and determining a temperature of the heater using the derived heater resistance ($R_H$);
the control circuit stores therein an initial heater resistance $R_{HO}$ and an initial head resistance $R_{WO}$, as measured at the same temperature before the heater is aged, the initial heater resistance $R_{HO}$ being a value of the heater resistance ($R_H$), the initial head resistance $R_{WO}$ being a value of the resistance ($R_w$) of the heater lead, wherein after a lapse of a given period of time since an engine which emits the exhaust gas was stopped, the control circuit enters an aging rate calculating mode to measure the resistance $R_w$ of the heater lead and the heater resistance $R_H$ and calculate an aging rate k of the heater according to an equation below $$k=(R_H/R_w)/(R_{HO}/R_{WO})$$

and wherein in at least one of the burning mode and the measuring mode, the control circuit uses the aging rate k and the heater resistance ($R_H$) to calculate the temperature of the heater.

2. A particulate matter sensing system as set forth in claim 1, wherein the particulate matter sensor includes a sensor device and a holding portion, the sensor device having the deposition portion, the electrodes, the heater, the heater leads, and the sensing line formed thereon, the holding portion surrounding the sensor device with the deposition portion exposed and retaining the sensor device, and wherein the heater is disposed outside the holding portion, a joint between the sensing line and the heater lead being located closer to the heater than the holding portion is.

3. A particulate matter sensing system as set forth in claim 1, wherein the heater is higher in resistance than either of the heater leads.

4. A particulate matter sensing system as set forth in claim 1, wherein in the measuring mode, the control circuit uses the calculated temperature of the heater to correct a measured value of the resistance ($R_{PM}$) of the particulate matter and uses the corrected measured value of the resistance ($R_{PM}$) to calculate the amount of the particulate matter.

5. A particulate matter sensing system as set forth in claim 1, wherein in the burning mode, the control circuit controls an amount of electrical current delivered to the heater to bring the calculated temperature of the heater to within a given range.

6. A particulate matter sensing system comprising:
a particulate matter sensor; and
a control circuit wherein:
the particulate matter sensor comprises:
a deposition portion on which particulate matter in exhaust gas is permitted to be accumulated;
a pair of electrodes which are disposed on the deposition portion and are separate from each other;
a heater which heats the deposition portion; and
a pair of heater leads which are connected to the heater and define a path through which an electrical current is delivered to the heater;
a sensing line is connected to at least one of the heater leads to measure a resistance of the one of the heater leads;
the control circuit is connected to the particulate matter sensor, the control circuit selectively operates in a measuring mode and a burning mode, the measuring mode being to measure a resistance ($R_{PM}$) of the particulate matter accumulated between the electrodes and calculate an amount of the particulate matter in the exhaust gas using the measured resistance, the burning mode being to energize the heater to produce heat to burn off the particulate matter accumulated on the deposition portion), wherein in at least one of the measuring mode and the burning mode, the control circuit uses a resistance ($R_w$) of the heater leads, as measured using the sensing line, to calculate a lead resistance (Rwab) that is sum of the resistances ($R_w$) of the respective heater leads and also determine a total resistance (Rs) that is sum of a heater resistance ($R_H$) of the heater and the lead resistance (Rwab), the control circuit also subtracting the lead resistance (Rwab) from the total resistance (Rs) to derive the heater resistance ($R_H$) and determining a temperature of the heater using the derived heater resistance ($R_H$);
the control circuit stores therein an initial heater resistance $R_{HO}$ and an initial head resistance $R_{WO}$, as measured at the same temperature before the heater is aged, the initial heater resistance $R_{HO}$ being a value of the heater resistance ($R_H$), the initial head resistance $R_{WO}$ being a value of the resistance ($R_w$) of the heater lead, wherein after a lapse of a given period of time since an engine which emits the exhaust gas was stopped, the control circuit enters an aging rate calculating mode to measure the resistance $R_w$ of the heater lead and the heater resistance $R_H$ and calculate an aging rate k of the heater according to an equation below $$k=(R_H/R_w)/(R_{HO}/R_{WO})$$

and wherein the control circuit determines that the heater is malfunctioning when the aging rate k has exceeded a given threshold value.

7. A particulate matter sensing system comprising:
a particulate matter sensor; and
a control circuit; wherein:
the particulate matter sensor comprises:
- a deposition portion on which particulate matter in exhaust gas is permitted to be accumulated;
- a pair of electrodes which are disposed on the deposition portion and are separate from each other;
- a heater which heats the deposition portion; and
- a pair of heater leads which are connected to the heater and define a path through which an electrical current is delivered to the heater;

a sensing line is connected to at least one of the heater leads to measure a resistance of the one of the heater leads;

the control circuit is connected to the particulate matter sensor, the control circuit selectively operates in a measuring mode and a burning mode, the measuring mode being to measure a resistance ($R_{PM}$) of the particulate matter accumulated between the electrodes and calculate an amount of the particulate matter in the exhaust gas using the measured resistance, the burning mode being to energize the heater to produce heat to burn off the particulate matter accumulated on the deposition portion), wherein in at least one of the measuring mode and the burning mode, the control circuit uses a resistance ($R_w$) of the heater leads, as measured using the sensing line, to calculate a lead resistance (Rwab) that is sum of the resistances ($R_w$) of the respective heater leads and also determine a total resistance (Rs) that is sum of a heater resistance ($R_H$) of the heater and the lead resistance (Rwab), the control circuit also subtracting the lead resistance (Rwab) from the total resistance (Rs) to derive the heater resistance ($R_H$) and determining a temperature of the heater using the derived heater resistance ($R_H$);

the control circuit stores therein an initial heater resistance $R_{HO}$ and an initial head resistance $R_{WO}$, as measured at the same temperature before the heater is aged, the initial heater resistance $R_{HO}$ being a value of the heater resistance ($R_H$), the initial head resistance $R_{WO}$ being a value of the resistance ($R_w$) of the heater lead, wherein when the heater and the heater leads are placed at the same temperature, the control circuit enters an aging rate calculating mode to measure the resistance $R_w$ of the heater lead and the heater resistance $R_H$ and calculate an aging rate k of the heater according to an equation below $$k=(R_H/R_w)/(R_{HO}/R_{WO})$$

and wherein in at least one of the burning mode and the measuring mode, the control circuit uses the aging rate k and the heater resistance ($R_H$) to calculate the temperature of the heater.

8. A particulate matter sensing system comprising:
a particulate matter sensor; and
a control circuit; wherein:
the particulate matter sensor comprises:
- a deposition portion on which particulate matter in exhaust gas is permitted to be accumulated;
- a pair of electrodes which are disposed on the deposition portion and are separate from each other;
- a heater which heats the deposition portion; and
- a pair of heater leads which are connected to the heater and define a path through which an electrical current is delivered to the heater;

a sensing line is connected to at least one of the heater leads to measure a resistance of the one of the heater leads; and the control circuit is connected to the particulate matter sensor, the control circuit selectively operates in a measuring mode and a burning mode, the measuring mode being to measure a resistance ($R_{PM}$) of the particulate matter accumulated between the electrodes and calculate an amount of the particulate matter in the exhaust gas using the measured resistance, the burning mode being to energize the heater to produce heat to burn off the particulate matter accumulated on the deposition portion), wherein in at least one of the measuring mode and the burning mode, the control circuit uses a resistance ($R_w$) of the heater leads, as measured using the sensing line, to calculate a lead resistance (Rwab) that is sum of the resistances ($R_w$) of the respective heater leads and also determine a total resistance (Rs) that is sum of a heater resistance ($R_H$) of the heater and the lead resistance (Rwab), the control circuit also subtracting the lead resistance (Rwab) from the total resistance (Rs) to derive the heater resistance ($R_H$) and determining a temperature of the heater using the derived heater resistance ($R_H$);

the control circuit stores therein an initial heater resistance $R_{HO}$ and an initial head resistance $R_{WO}$, as measured at the same temperature before the heater is aged, the initial heater resistance $R_{HO}$ being a value of the heater resistance ($R_H$), the initial head resistance $R_{WO}$ being a value of the resistance ($R_w$) of the heater lead, wherein when the heater and the heater leads are placed at the same temperature, the control circuit enters an aging rate calculating mode to measure the resistance $R_w$ of the heater lead and the heater resistance $R_H$ and calculate an aging rate k of the heater according to an equation below $$k=(R_H/R_w)/(R_{HO}/R_{WO})$$

and wherein the control circuit determines that the heater is malfunctioning when the aging rate k has exceeded a given threshold value.

* * * * *